(12) United States Patent
Kishi et al.

(10) Patent No.: US 8,697,811 B2
(45) Date of Patent: Apr. 15, 2014

(54) CURABLE RESIN COMPOSITION AND CURED RESIN

(75) Inventors: Hajime Kishi, Himeji (JP); Yumi Kunimitsu, Himeji (JP); Jin Imade, Himeji (JP); Shinya Oshita, Kamisu (JP); Yoshihiro Morishita, Kamisu (JP); Mitsunori Asada, Kurashiki (JP)

(73) Assignees: Kuraray Co., Ltd., Kurashiki-shi (JP); Hyogo, Kobe-shi (JP)

( * ) Notice: Subject to any disclaimer, the term of this patent is extended or adjusted under 35 U.S.C. 154(b) by 71 days.

(21) Appl. No.: 12/867,797

(22) PCT Filed: Feb. 12, 2009

(86) PCT No.: PCT/JP2009/052280
§ 371 (c)(1),
(2), (4) Date: Aug. 16, 2010

(87) PCT Pub. No.: WO2009/101961
PCT Pub. Date: Aug. 20, 2009

(65) Prior Publication Data
US 2011/0003947 A1 Jan. 6, 2011

(30) Foreign Application Priority Data

Feb. 15, 2008 (JP) ................................. 2008-034333
Jul. 17, 2008 (JP) ................................. 2008-185529

(51) Int. Cl.
*C08L 53/00* (2006.01)

(52) U.S. Cl.
USPC ........... 525/308; 525/94; 525/299; 525/92 H; 525/302

(58) Field of Classification Search
USPC .......................... 525/92 H, 93, 299, 302, 308
See application file for complete search history.

(56) References Cited

U.S. PATENT DOCUMENTS

| | | | |
|---|---|---|---|
| 4,962,162 A | 10/1990 | Kosuda et al. | |
| 5,264,527 A | 11/1993 | Varshney et al. | |
| 5,294,674 A | 3/1994 | Varshney et al. | |
| 5,591,816 A | 1/1997 | Varshney et al. | |
| 5,668,231 A | 9/1997 | Varshney et al. | |
| 5,677,387 A * | 10/1997 | Bayard et al. ............. | 525/299 |
| 6,329,480 B1 | 12/2001 | Uchiumi et al. | |
| 6,878,789 B2 | 4/2005 | Uchiumi et al. | |
| 6,894,113 B2 | 5/2005 | Court et al. | |
| 2002/0009581 A1* | 1/2002 | Kishi et al. ............. | 428/293.1 |
| 2004/0147674 A1 | 7/2004 | Kakeda et al. | |
| 2007/0173604 A1 | 7/2007 | Taniguchi et al. | |

FOREIGN PATENT DOCUMENTS

| | | | | |
|---|---|---|---|---|
| EP | 524054 A1 * | 1/1993 | ............... | C08F 2/44 |
| JP | 6-43508 | 9/1988 | | |
| JP | 7-25859 | 11/1993 | | |
| JP | 06-093060 | 4/1994 | | |
| JP | 11-335432 | 12/1999 | | |
| JP | 2000 169665 | 6/2000 | | |
| JP | 2002 60449 | 2/2002 | | |
| JP | 2002 226590 | 8/2002 | | |
| JP | 2003-535181 | 11/2003 | | |
| JP | 2005307063 A * | 11/2005 | ............. | C08L 53/00 |
| JP | 2006 124589 | 5/2006 | | |
| JP | 2007-154160 | 6/2007 | | |
| WO | 02 092696 | 11/2002 | | |
| WO | 2005 073270 | 8/2005 | | |
| WO | WO 2007/009957 A1 | 1/2007 | | |
| WO | WO 2007075718 A1 * | 7/2007 | | |

OTHER PUBLICATIONS

Machine Translation of JP 2005307063 A.*
Peter A. Lovell, "An Overview of the Preparation and Use of Emulsion Polymer Particles for the Toughening of Plastics", Macromolecular Symposia, vol. 92, 1995, pp. 71-81.
A. Maazouz, et al., "Toughening of Epoxies Design of the Separated Phase Particles (Reactive Rubber or Core-Shell Particles)", Polymeric Materials Science and Engineering, vol. 70, 1994, pp. 13-14.
Georges Moineau, et al., "Synthesis of fully acrylic thermoplastic elastomers by atom transfer radical polymerization (ATRP), $2^a$ Effect of the catalyst on the molecular control and the rheological properties of the triblock copolymers", Macromolecular Chemistry and Physics, vol. 201 No. 11, 2000, pp. 1108-1114.
A. Bonnet, et al., "Acrylic Block Copolymers: A New Tool for Composite Manufacturers", "International SAMPE Symposium and Exhibition", vol. 50, 2005, pp. 847-854.
Ryan M. Hydro, et al., "Epoxies Toughened with Triblock Copolymers" Journal of Polymer Science, Part B: Polymer Physics, vol. 45 No. 12, Jun. 15, 2007, pp. 1470-1481.

* cited by examiner

Primary Examiner — Mark Kaucher
(74) Attorney, Agent, or Firm — Oblon, Spivak, McClelland, Maier & Neustadt, L.L.P.

(57) ABSTRACT

A curable resin composition, which contains, with respect to 100 parts of an epoxy resin, 1 to 70 parts of an epoxy resin curing agent and 1 to 50 parts of an acrylic block copolymer, and the acrylic block copolymer contains (α) at least one polymer block A composed of a structural unit derived from an alkyl methacrylate and at least one polymer block B composed of a structural unit derived from an alkyl acrylate, has a weight average molecular weight (Mw) of 30,000 to 300,000 and a molecular weight distribution (Mw/Mn) of 1.5 or less, and contains 3 to 60 percent by mass of the polymer block A. In addition, a cured resin is formed from the above curable resin composition.

24 Claims, 3 Drawing Sheets

CURABLE RESIN COMPOSITION AND CURED RESIN

TECHNICAL FIELD

The present invention relates to a curable epoxy resin composition and a cured resin obtained by curing the same. In more particular, the present invention relates to a curable epoxy resin composition and a cured resin obtained by curing the same, the cured resin being excellent in fracture toughness and peel adhesive strength and also being excellent in shear adhesive strength while maintaining excellent heat resistance and elastic modulus inherent in an epoxy resin.

BACKGROUND ART

Since being excellent in heat resistance, chemical resistance, corrosion resistance, electrical properties, and the like, and having a high elastic modulus, an epoxy resin has been widely used in various applications, such as a sealing material for electric and electronic materials, a matrix resin represented, for example, by a fiber reinforced composite material for sport application, aircraft materials, and the like, a laminate for electrical use including a printed circuit board, an automobile component, a coating material for civil engineering and construction, and a structure adhesive.

However, disadvantageously, since the epoxy resin is inferior in toughness, is fragile, and is liable to be chipped, and in addition, the adhesion of the epoxy resin to various substrates is also not sufficient, these properties thereof are required to be improved.

Heretofore, in order to improve the toughness of a thermosetting resin composition mainly composed of an epoxy resin so as not to be easily fractured, addition of a reactive rubber or polymer particles having a core/shell structure has been generally performed. As the reactive rubber for this purpose, for example, a carboxyl-terminated random copolymer of butadiene and acrylonitrile (CTBN) and an amino-terminated random copolymer of butadiene and acrylonitrile (ATBN) have been known, and as the polymer particles having a core/shell structure, for example, polymer particles containing a poly(butyl acrylate) or a polybutadiene as the core and a poly(methyl methacrylate) as the shell has been known (see Non-Patent Documents 1 and 2).

However, in the case of the conventional techniques described above, in order to obtain a sufficient effect of improving a fracture toughness, a large amount of the reactive rubber or the polymer particles having a core/shell structure must be added to an epoxy resin, and as a result, there has been a problem in that excellent heat resistance and elastic modulus inherent in the epoxy resin are degraded.

In addition, in order to obtain a prepreg excellent in heat resistance and impact resistance, an epoxy resin composition for a prepreg has been proposed in which an epoxy resin curing agent and a thermoplastic resin, such as a polycarbonate, a polysulfone, a poly(ether sulfone), a poly(ether imide), or an aromatic polyester, are blended with an epoxy resin (see Patent Document 1).

However, this epoxy resin composition has a high viscosity and is inferior in handling properties and processability, a cured resin obtained from this epoxy resin composition is not satisfactory in terms of heat resistance and chemical resistance, and furthermore, incompatible portions and/or voids may be generated in the cured resin in some cases.

Furthermore, a technique has been proposed in which impact resistance and toughness of an epoxy resin are improved by blending a block copolymer therewith, and as the block copolymer in this case, there are mentioned a block copolymer of polystyrene-polybutadiene-poly(methyl methacrylate), a block copolymer of polybutadiene-poly(methyl methacrylate), a block copolymer of poly(methyl methacrylate)-polybutadiene-poly(methyl methacrylate), or a block copolymer of poly(methyl methacrylate)-poly(butyl acrylate)-poly(methyl methacrylate) (see Patent Documents 2 to 4).

However, in the above conventional techniques in which a block copolymer is blended with an epoxy resin, when a block copolymer containing a polybutadiene block (a block copolymer of polystyrene-polybutadiene-poly(methyl methacrylate), a block copolymer of polybutadiene-poly(methyl methacrylate), or a block copolymer of poly(methyl methacrylate)-polybutadiene-poly(methyl methacrylate)) is blended, the toughness and the impact resistance of the epoxy resin are improved to a certain extent; however, due to unsaturated double bonds of the polybutadiene block, the weather resistance of a cured resin obtained from the epoxy resin composition is liable to be degraded.

In addition, when the inventors of the present invention investigated properties of a cured resin which was obtained by curing a curable resin composition prepared by blending the block copolymer of poly(methyl methacrylate)-poly(butyl acrylate)-poly(methyl methacrylate) disclosed in Patent Documents 2 to 4 with an epoxy resin together with an epoxy resin curing agent, it was found that although the cured epoxy resin obtained from the epoxy resin composition containing the above block copolymer had an excellent weather resistance since containing no unsaturated double bonds, compared to the case in which the block copolymer of polystyrene-polybutadiene-poly(methyl methacrylate) was used, the effect of improving a fracture toughness was low. Furthermore, it was also found that compared to the case in which the polymer particles having a core/shell structure disclosed in Non-Patent Documents 1 and 2 was used, the effect of improving a fracture toughness was equal to or less than that thereof, and a sufficiently satisfactory fracture toughness was not obtained.

In particular, according to the epoxy resin composition disclosed in Patent Document 4, as the epoxy resin curing agent, an aromatic polyamine, such as diaminodiphenylsulfone, is exclusively used; however, the fracture toughness of a cured resin cannot be considered to be sufficient which is obtained by curing an epoxy resin composition prepared by blending the block copolymer of poly(methyl methacrylate)-poly(butyl acrylate)-poly(methyl methacrylate) actually used in one example of Patent Document 4 with an epoxy resin together with a diaminodiphenylsulfone curing agent.

In addition, in general, when the fracture toughness of a cured resin or the like is improved, concomitant therewith, the peel adhesive strength is improved, and on the other hand, the shear adhesive strength tends to decrease; hence, a cured resin has been desired which improves the shear adhesive strength as well as improving the fracture toughness and the peel adhesive strength.

[Patent Document 1]: Japanese Examined Patent Application Publication No. 6-43508
[Patent Document 2]: Japanese Unexamined Patent Application Publication (Translation of PCT Application) No. 2003-535181
[Patent Document 3]: WO2007/009957
[Patent Document 4]: Japanese Unexamined Patent Application Publication No. 2007-154160
[Patent Document 5]: Japanese Unexamined Patent Application Publication No. 6-93060

[Patent Document 6]: Japanese Examined Patent Application Publication No. 7-25859
[Patent Document 7]: Japanese Unexamined Patent Application Publication No. 11-335432
[Non-Patent Document 1]: P. Lovell, "Macromol. Symp.", 92, 1995, p 71-81
[Non-Patent Document 2]: A. Maazouz et al. "Polymer Material Science Engineering", 70, 1994, p 13-14
[Non-Patent Document 3]: G. Moineau et al. "Macromol. Chem. Phys.", 201, 2000, p. 1108-1114
[Non-Patent Document 4]: A. Bonnet et al. "International SAMPLE Symposium and Exhibition", 50, 2005, p 847-854
[Non-Patent Document 5]:r. H. Hydro et al. "J. Polym. Sci., Part B: Polym. Phys.", 45(12), 2007, p. 1470-1481

DISCLOSURE OF INVENTION

Problems to be Solved by the Invention

An object of the present invention is to provide a curable epoxy resin composition and a cured epoxy resin formed therefrom, the curable epoxy resin composition forming a cured resin which is excellent in fracture toughness, is hardly fractured even if receiving an external force, is strong, and is excellent in durability, while maintaining properties, such as excellent heat resistance and elastic modulus, inherent in an epoxy resin; which is strongly adhered to various types of materials to form a laminate construction and/or a composite construction having an excellent strength; and further which is excellent in weather resistance, chemical resistance, and the like.

Means for Solving the Problems

In order to solve the above problems, the inventors of the present invention have carried out intensive research. As a result, it was found that when a block copolymer which contains at least one alkyl methacrylate polymer block and at least one alkyl acrylate polymer block and which has a uniform molecular weight, that is, which has a specific weight average molecular weight and a specific molecular weight distribution (Mw/Mn) or less, is blended with an epoxy resin at a predetermined ratio together with an epoxy resin curing agent, an epoxy resin composition is obtained capable of forming a cured resin which is excellent in fracture toughness while maintaining excellent heat resistance and elastic modulus inherent in an epoxy resin.

Furthermore, the inventors of the present invention also found that the above epoxy resin composition is strongly adhered to various types of materials, a cured resin obtained from the epoxy resin composition has not only a high peel adhesive strength but also an excellent shear adhesive strength, and in addition, properties of the cured resin, such as weather resistance and chemical resistance, are also excellent.

In addition, the inventors of the present invention found that in the epoxy resin composition described above, when a bisphenol A epoxy resin is used as the epoxy resin, and a phenol novolac resin is used as the epoxy resin curing agent, an epoxy resin composition capable of forming a cured resin which is significantly excellent in properties, such as fracture toughness, peel adhesive strength, and shear adhesive strength, can be obtained.

Furthermore, the inventors of the present invention found that the excellent fracture toughness, peel adhesive strength, and shear adhesive strength of the cured resin formed from the epoxy resin composition described above are derived from a microphase separation structure, that is, a microphase separation structure in which in a cured epoxy resin matrix, a poly(alkyl acrylate) block (soft segment) in the above specific acrylic block copolymer forms a micro spherical structure having a uniform size and is dispersed or forms a micro linear structure having a uniform size and is dispersed.

In addition, the inventors of the present invention found that among the dispersion states each forming the microphase separation structure, when the micro linear structure is formed and is dispersed, the fracture toughness and the peel adhesive strength of the cured resin are further improved, and that depending on the composition, the micro linear structure is formed and is dispersed so as to be oriented in a predetermined direction. Furthermore, it was also found that when the micro linear structure is dispersed so as to be oriented in a predetermined direction, the fracture toughness and the peel adhesive strength are further improved, and based on the above various findings, the present invention was completed.

That is, the present invention relates to a curable resin composition (1) which includes:

(i) an epoxy resin (a), an epoxy resin curing agent (b), and an acrylic block copolymer (c), (ii) wherein the acrylic block copolymer (c) is an acrylic block copolymer which satisfies the following requirements ($\alpha$) to ($\delta$):

($\alpha$) the acrylic block copolymer is a block copolymer containing at least one polymer block A mainly composed of a structural unit derived from an alkyl methacrylate and at least one polymer block B mainly composed of a structural unit derived from an alkyl acrylate;

($\beta$) the weight average molecular weight is 30,000 to 300,000;

($\gamma$) the molecular weight distribution [weight average molecular weight (Mw)/number average molecular weight (Mn)] is 1.5 or less; and ($\delta$) the content ratio of the polymer block A is 3 to 60 percent by mass; and (iii) with respect to 100 parts by mass of the epoxy resin (a), 1 to 70 parts by mass of the epoxy resin curing agent (b) and 1 to 50 parts by mass of the acrylic block copolymer (c) are contained.

In addition, in the present invention, (2) the curable resin composition (1) further includes a curing accelerator;

(3) in the curable resin composition (1) or (2), the epoxy resin (a) is a bisphenol A epoxy resin;

(4) in one of the curable resin compositions (1) to (3), the epoxy resin curing agent (b) is a phenol novolac resin;

(5) in one of the curable resin compositions (1) to (4), the acrylic block copolymer (c) is an acrylic block copolymer mainly composed of at least one type selected from a triblock copolymer composed of polymer block A-polymer block B-polymer block A and a diblock copolymer composed of polymer block A-polymer block B;

(6) in one of the curable resin compositions (1) to (5), the polymer block A in the acrylic block copolymer (c) is a polymer block composed of a poly(methyl methacrylate); and (7) in one of the curable resin compositions (1) to (6), the polymer block B in the acrylic block copolymer (c) is a polymer block composed of a polymer of at least one type of alkyl acrylate selected from ethyl acrylate, butyl acrylate, octyl acrylate, and 2-ethylhexyl acrylate.

In addition, in the present invention, (8) in one of the curable resin compositions (1) to (7), the content ratio of the polymer block A in the acrylic block copolymer (c) is 15 to 35 percent by mass;

(9) in one of the curable resin compositions (1) to (8), when curing is performed at a temperature of 20° C. to 250° C. for 1 to 24 hours, a cured resin is formed having a microphase separation structure in which the polymer block B in the acrylic block copolymer (c) forms a micro phase separation structure and is dispersed in a matrix composed of a cured epoxy resin;

(10) in the curable resin composition (9), when the curing is performed at a temperature of 20° C. to 250° C. for 1 to 24 hours, the cured resin is formed having a microphase separation structure in which the polymer block B in the acrylic block copolymer (c) forms a micro linear structure and is dispersed in the matrix composed of the cured epoxy resin; and

(11) in the curable resin composition (10), when the curing is performed at a temperature of 20° C. to 250° C. for 1 to 24 hours, the cured resin is formed having a microphase separation structure in which the polymer block B in the acrylic block copolymer (c) forms a micro linear structure and is dispersed in the matrix composed of the cured epoxy resin so as to be oriented in a predetermined direction.

Furthermore, the present invention relates to

(12) a cured resin obtained by curing one of the curable resin compositions (1) to (11);

(13) the cured resin (12) has a microphase separation structure in which the polymer block B in the acrylic block copolymer (c) forms a micro phase separation structure and is dispersed in a cured epoxy resin matrix;

(14) the cured resin (13) has a microphase separation structure in which the polymer block B in the acrylic block copolymer (c) forms a micro linear structure and is dispersed in the cured epoxy resin matrix;

(15) the cured resin (14) has a microphase separation structure in which the polymer block B in the acrylic block copolymer (c) forms a micro linear structure and is dispersed in the cured epoxy resin matrix so as to be oriented in a predetermined direction;

(16) in one of the cured resins (12) to (15), a fracture toughness value (K1c) by a Single Edge Notched Bending (SENB) test in accordance with ASTM D5045-91 is 1.6 MPa·m$^{1/2}$ or more; and

(17) in one of the cured resins (12) to (16), a peel adhesive strength to an aluminum plate at a peeling rate of 100 mm/min in accordance with JIS K 6854-3 is 10 N/25 mm or more.

Advantages

While preferably maintaining properties, such as excellent heat stability and elastic modulus, inherent in an epoxy resin, the cured resin obtained by curing the curable resin composition of the present invention is excellent in fracture toughness, is hardly fractured even if receiving an external force, is strong, and is excellent in durability.

Furthermore, since the cured resin obtained by curing the curable resin composition of the present invention is strongly adhered to various materials, a laminate construction and/or a composite construction having an excellent strength, that is, a high peel adhesive strength and a high shear adhesive strength, can be formed, and in addition, the cured resin also has excellent weather resistance, chemical resistance, and the like.

Accordingly, by efficiently using the excellent properties described above, the curable resin composition of the present invention can be effectively used in various applications, such as a sealing material for electric and electronic materials, a laminate for electrical use including a printed circuit board, an automobile component, a structure adhesive, an electrical insulating material, a coating material, a material for civil engineering and construction, and a matrix resin represented, for example, by a fiber reinforced composite material for sport application, aircraft materials, and the like.

BEST MODES FOR CARRYING OUT THE INVENTION

Figure 1:
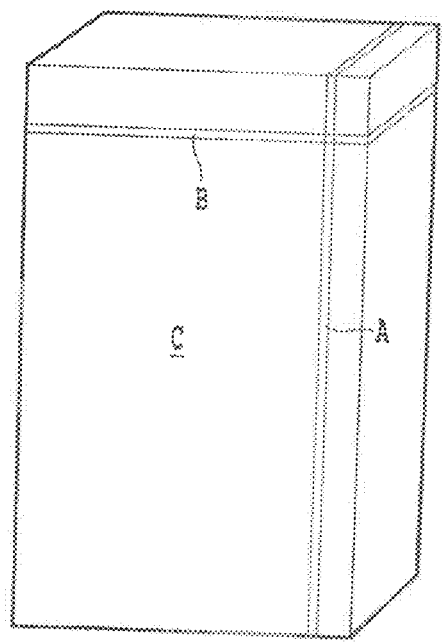
FIG. 1 is a view illustrating a method for sampling samples (A and B) from a test specimen (C) for measurement of fracture toughness values used for observation of a phase structure of a cured resin using a transmission electron microscope.

Hereinafter, the present invention will be described in detail.

A curable resin composition of the present invention is a curable resin composition containing an epoxy resin (a) as a primary component.

As the epoxy resin (a) functioning as a primary component, any conventionally known epoxy resins may be used. As the examples of the epoxy resin (a) which can be used in the present invention, for example, there may be mentioned epoxy resins (polyepoxy compounds) each containing at least two epoxy groups in its molecule, such as aromatic/aliphatic ring-containing epoxy resins including a bisphenol epoxy resin, a phenol novolac epoxy resin, an o-cresol novolac epoxy resin, a biphenyl epoxy resin, a dicyclopentadiene epoxy resin, a diphenylfluorene epoxy resin, the aforementioned resins substituted with a halogen, an amino, or an alkyl group, a glycidyl ester epoxy resin, a naphthalene epoxy resin, and a heterocyclic epoxy resin, an isocyanate modified epoxy resin, a diarylsulfone epoxy resin, a hydroquinone epoxy resin, a hydantoin epoxy resin, resorcinol diglycidyl ether, triglycidyl-p-aminophenol, m-aminophenol triglycidyl ether, tetraglycidyl methylene dianiline, (trihydroxy phenyl) methane triglycidyl ether, and tetraphenylethane tetraglycidyl ether.

According to the present invention, as the epoxy resin (a), at least one of the above epoxy resins (polyepoxy resins) may be used.

Among these mentioned above, as the epoxy resin (a), a bisphenol epoxy resin is preferably used, for example, in terms of handling properties and processability of a curable resin composition, and heat resistance, fracture toughness, and peel adhesive strength of a cured resin. As particular examples of the bisphenol epoxy resin, for example, there may be mentioned a bisphenol A epoxy resin obtained by a reaction between bisphenol A and epichlorohydrine, a bisphenol F epoxy resin obtained by a reaction between bisphenol F and epichlorohydrine, a bisphenol S epoxy resin obtained by a reaction between bisphenol S and epichlorohydrine, a bisphenol AD epoxy resin obtained by a reaction between bisphenol AD and epichlorohydrine, and the aforementioned resins substituted with a halogen or an alkyl group. Among these mentioned above, a bisphenol A epoxy resin is preferably used in terms of handling properties and processability of a curable resin composition and more excellent heat resistance of a cured resin, and in particular, bisphenol A diglycidyl ether is more preferably used.

The type of epoxy resin curing agent (b) used for the curable resin composition of the present invention is not particularly limited, and any epoxy resin curing agents which have been used heretofore may be used.

As the epoxy resin curing agent, a compound having at least two active groups reactive with an epoxy group at room temperature or more is generally used, and as the active groups, for example, an amino group, an anhydride group, an azido group, and a hydroxyl group may be mentioned.

As particular examples of the epoxy resin curing agent (b) used in the present invention, for example, there may be mentioned a polyphenol compound, such as a phenol novolac resin or a cresol novolac resin, various isomers of dicyandiamide, diaminodiphenylmethane, and diaminodiphenylsulfone, an aminobenzoic acid ester, an imidazole derivative, an aliphatic amine, an alicyclic polyamine, an aromatic polyamine, tetramethylguanidine, a thiourea-added amine, various types of anhydrides (including a carboxylic acid anhydride such as methyl hexahydrophthalic anhydride), a carboxylic acid hydrazide, a carboxylic acid amide, a polymercaptan, a Lewis acid complex such as a boron trifluoride ethylamine complex, a resin having a cyanate group, a benzoxazine resin, an amineimide, a microcapsule type curing agent, and an imidazole type latent curing agent.

In the present invention, as the epoxy resin curing agent (b), in accordance with the type of epoxy resin (a) to be used, at least one of the epoxy resin curing agents mentioned above may be used.

In the present invention, in order to form a cured resin well compatible with an acrylic block copolymer (c), among the compounds mentioned above, as the epoxy resin curing agent (b), a polyphenol-based compound is preferably used, and in particular, a phenol novolac resin (PN) is preferably used.

As the type of phenol novolac resin, for example, a phenol-formaldehyde novolac or a phenol-aralkyl novolac may be mentioned.

In addition, as particular examples of the phenol novolac resin, for example, a phenol novolac, a bisphenol A novolac, a cresol novolac, a xylylene novolac, a triphenylmethane novolac, a biphenyl novolac, a dicyclopentadiene phenol novolac, a terpene phenol novolac, a biphenylene methylene novolac may be mentioned, and at least one of a phenol novolac, a bisphenol A novolac, and a cresol novolac is preferably used.

Whenever necessary, the curable resin composition of the present invention may contain a curing accelerator (d) for the epoxy resin together with the above epoxy resin curing agent (b).

As the examples of the curing accelerator (d) in this case, for example, a urea compound [such as 3-(3,4-dichlorophenyl)-1,1-dimethylurea], a phosphorous compound (such as triphenylphosphine), an organic metal salt [such as Co(III) acetylacetonate], and a tertiary amine may be mentioned, and at least one of them may be used.

Among these mentioned above, the phosphorous compound is preferably used, and triphenylphosphine is more preferably used.

When the curing accelerator (d) is used together with the epoxy resin curing agent (b), a curing time can be decreased as well as decreasing a curing temperature, and furthermore, for example, an effect of easily dissolving the epoxy resin curing agent (b) in the epoxy resin (a) can also be obtained.

However, the use of the curing accelerator (d) is not essential, and it may not be used.

The curable resin composition of the present invention contains an acrylic block copolymer (c) which satisfies the following requirements ($\alpha$) to ($\delta$) as a third component.

That is, the present invention must use an acrylic block copolymer which satisfies the following requirements ($\alpha$) to ($\delta$). They are:

($\alpha$) the acrylic block copolymer is a block copolymer containing at least one polymer block A mainly composed of a structural unit derived from an alkyl methacrylate and at least one polymer block B mainly composed of a structural unit derived from an alkyl acrylate;

($\beta$) the weight average molecular weight is 30,000 to 300,000;

($\gamma$) the molecular distribution [weight average molecular weight (Mw)/number average molecular weight (Mn)] is 1.5 or less; and ($\delta$) the content ratio of the polymer block A is 3 to 60 percent by mass.

In the acrylic block copolymer (c) used in the present invention, "the polymer block A mainly composed of a structural unit derived from an alkyl methacrylate" indicates "a polymer block containing 80 percent by mass or more of a structural unit derived from an alkyl methacrylate based on the mass of the polymer block A", and "the polymer block B mainly composed of a structural unit derived from an alkyl acrylate" indicates "a polymer block containing 80 percent by mass or more of a structural unit derived from an alkyl acrylate based on the mass of the polymer block B".

In the acrylic block copolymer (c) used in the present invention, the polymer block A contains preferably 90 percent by mass or more of the structural unit derived from an alkyl methacrylate and particularly preferably 95 to 100 percent by mass thereof, and the polymer block B contains preferably 90 percent by mass or more of the structural unit derived from an alkyl acrylate and particularly preferably 95 to 100 percent by mass thereof.

As the acrylic block copolymer (c), any block copolymer containing at least one polymer block A and at least one polymer block B may be used, and when the polymer block A, the polymer block B, and another polymer block are represented by A, B, and C, respectively, as the examples of the acrylic block copolymer (c) used in the present invention, for example, there may be mentioned an A-B type diblock copolymer; an A-B-A type, a B-A-B type, an A-B-C type, a B-A-C type, and a B-C-A type triblock copolymer; linear polyblock copolymers, such as an $(A-B)_n$ type, an $(A-B-)_nA$ type, and an $(B-A-)_nB$ type (in the formula, n is an integer of 2 or more); star type block copolymers, such as an $(A-B-)_nX$ type (X indicates a coupling residue), a $(C-B-A-)_nX$ type, and a $(C-A-B-)_nX$ type (in the above formula, n is an integer of 2 or more); and a comb type block copolymer. At least one of these mentioned above may be used. In the block copolymers mentioned above, as the another polymer block C, for example, an aromatic vinyl polymer block or a (hydrogenated) conjugated diene polymer block may be mentioned.

Among these mentioned above, in the present invention, as the acrylic block copolymer (c), at least one of the A-B-A type triblock copolymer and the A-B type diblock copolymer is preferably used, and in particular, the A-B-A type triblock copolymer is preferably used since this copolymer is well dispersed in the curable resin composition of the present invention and exhibits a high fracture toughness and adhesive strength when it is cured.

As the alkyl methacrylate forming "the structural unit derived from an alkyl methacrylate" which forms the polymer block A in the acrylic block copolymer (c), an alkyl methacrylate forming a polymer block A having high compatibility with an epoxy resin is preferable, and for example, there may be mentioned an alkyl methacrylate in which the alkyl group has 1 to 18 carbon atoms, such as methyl methacrylate, ethyl methacrylate, propyl methacrylate, n-butyl methacrylate, t-butyl methacrylate, n-hexyl methacrylate, cyclohexyl methacrylate, 2-ethylhexyl methacrylate, n-octyl methacrylate, lauryl methacrylate, tridecyl methacrylate, stearyl methacrylate, and isobonyl methacrylate. The polymer block A may be formed from only one of the alkyl methacrylates mentioned above or may be formed from at least two thereof.

Among these mentioned above, the polymer block A is preferably formed from methyl methacrylate since it has significantly high compatibility with an epoxy resin, can be easily available at an inexpensive price as a common compound, and can impart excellent weather resistance not only to the acrylic block copolymer (c) but also to a cured resin obtained from the curable resin composition of the present invention which contains the acrylic block copolymer (c).

In addition, in view of the heat resistance, the block copolymer A of the acrylic block copolymer (c) is preferably formed of a poly(methyl methacrylate) having a syndiotacticity of 60 percent by mass or more, further 60 to 90 percent by mass, and particularly 70 to 80 percent by mass.

Furthermore, in order to form a cured resin having a high fracture toughness from the curable resin composition of the present invention while excellent heat resistance inherent in an epoxy resin is maintained, the glass transition temperature of the polymer block A in the acrylic block copolymer (c) is preferably 100° C. or more and more preferably 100° C. to 130° C.

As the alkyl acrylate forming "the structural unit derived from an alkyl acrylate" which forms the polymer block B in the acrylic block copolymer (c), for example, there may be mentioned an alkyl acrylate in which the alkyl group has 1 to 18 carbon atoms, such as methyl acrylate, ethyl acrylate, propyl acrylate, n-butyl acrylate, t-butyl acrylate, n-hexyl acrylate, cyclohexyl acrylate, 2-ethylhexyl acrylate, n-octyl acrylate, lauryl acrylate, tridecyl acrylate, and stearyl acrylate. The polymer block B may be formed from one of the alkyl acrylates mentioned above or may be formed from at least two thereof.

Among these mentioned above, the polymer block B is preferably formed from at least one of ethyl acrylate, butyl acrylate, octyl acrylate, and 2-ethylhexyl acrylate. By the polymer block B thus formed, the glass transition temperature of the polymer block B is −20° C. or less and is preferably in the range of −30° C. to −60° C., and the acrylic block copolymer (c) forms a microphase separation structure in the cured resin formed from the curable resin composition of the present invention to realize a significant effect of improving a fracture toughness, so that the curable resin composition of the present invention can be obtained which forms a cured resin having excellent fracture toughness and peel adhesive strength while excellent heat resistance and elastic modulus inherent in an epoxy resin are maintained.

In addition, among the alkyl acrylates mentioned above, since n-butyl acrylate and 2-ethylhexyl acrylate can be easily available at an inexpensive price as a common compound, and a polymer block B formed from at least one of the above alkyl acrylates is clearly phase-separated from the polymer block A, a curable resin composition which forms a cured resin having excellent fracture toughness and adhesive strength can be obtained. Hence, the polymer block B is preferably formed from at least one of n-butyl acrylate and 2-ethylhexyl acrylate and, in particular, is preferably formed from n-butyl acrylate.

The polymer block A in the acrylic block copolymer (c) may include, whenever necessary, a structural unit derived from a monomer other than an alkyl methacrylate as long as the effect of the present invention is not degraded (in general, based on the mass of the polymer block A, the content is 20 percent by mass or less, preferably 10 percent by mass or less, and more preferably 5 percent by mass or less). In addition, the polymer block B in the acrylic block copolymer (c) may include, whenever necessary, a structural unit derived from a monomer other than an alkyl acrylate as long as the effect of the present invention is not degraded (in general, based on the mass of the polymer block B, the content is 20 percent by mass or less, preferably 10 percent by mass or less, and more preferably 5 percent by mass or less).

As the structural units which may be included, whenever necessary, in the polymer block A and the polymer block B, for example, besides an alkyl acrylate (in the case of the polymer block A) and an alkyl methacrylate (in the case of the polymer block B), as a common structural unit for the polymer block A and the polymer block B, there may be mentioned a structural unit derived from a (meth)acrylic ester having a functional group, such as methoxyethyl(meth)acrylate, ethoxyethyl(meth)acrylate, diethylaminoethyl(meth)acrylate, 2-hydroxyethyl(meth)acrylate, aminoethyl(meth)acrylate, glycidyl(meth)acrylate, or tetrahydrofurfuryl(meth)acrylate; an unsaturated monomer having a carboxyl group, such as (meth)acrylic acid, crotonic acid, maleic acid, maleic anhydride, or fumaric acid, or an amide thereof; an aromatic vinyl monomer, such as styrene, α-methylstyrene, or p-methylstyrene; a conjugated diene monomer, such as butadiene or isoprene; an olefinic monomer, such as ethylene or propylene; and a lactone monomer, such as ε-caprolactone or valerolactone. The polymer block A and the polymer block B may contain at least one of the structural units mentioned above.

When the acrylic block copolymer (c) is an acrylic block copolymer containing at least two polymer blocks A, the at least two polymer blocks A may be identical to each other [for example, the molecular weights (weight average molecular weight and number average molecular weight), the molecular structures (composition ratio and arrangement of monomer units, configuration, crystal structure, and the like), and the like may be completely identical to each other] or may be different from each other [for example, at least one of the molecular weights (weight average molecular weight and number average molecular weight), the molecular structures (composition ratio and arrangement of monomer units, configuration, crystal structure, and the like), and the like may be different from each other]. In addition, when the acrylic block copolymer (c) is an acrylic block copolymer containing at least two polymer blocks B, the at least two polymer blocks B may be identical to each other [for example, the molecular weights (weight average molecular weight and number average molecular weight), the molecular structures (composition ratio and arrangement of monomer units, configuration crystal structure, and the like), and the like may be completely identical to each other] or may be different from each other [for example, at least one of the molecular weights (weight average molecular weight and number average molecular weight), the molecular structures (composition ratio and arrangement of monomer units, configuration, crystal structure, and the like), and the like may be different from each other].

Among these mentioned above, in the present invention, as the acrylic block copolymer (c), at least one of a triblock copolymer composed of poly(methyl methacrylate)-poly(n-butyl acrylate)-poly(methyl methacrylate) and a diblock copolymer composed of poly(methyl methacrylate)-poly(n-butyl acrylate) is preferably used, and in particular, the triblock copolymer composed of poly(methyl methacrylate)-poly(n-butyl acrylate)-poly(methyl methacrylate) is more preferably used. In this case, in the triblock copolymer and the diblock copolymer, the poly(methyl methacrylate) block contains, as the ratio of the structural unit derived from methyl methacrylate based on the mass of the poly(methyl methacrylate) block, preferably 80 percent by mass or more, more preferably 90 percent by mass or more, and particularly preferably 95 to 100 percent by mass, and the poly(n-butyl acrylate) contains, as the ratio of the structural unit derived from n-butyl acrylate based on the mass of the poly(n-butyl acrylate), preferably 80 percent by mass or more, more preferably 90 percent by mass or more, and particularly preferably 95 to 100 percent by mass.

In view of the compatibility with the epoxy resin (a) and the effect of improving a fracture toughness, the weight average molecular weight (Mw) of the acrylic block copolymer (c) used in the present invention is 30,000 to 300,000 [the above requirement ($\beta$)], preferably 50,000 to 200,000, more preferably 70,000 to 180,000, and even more preferably 80,000 to 170,000.

When the weight average molecular weight (Mw) of the acrylic block copolymer (c) is too small (in particular, when it is smaller than 30,000), the effect of improving a fracture toughness, a peel adhesive strength, and the like becomes insufficient. On the other hand, when the weight average molecular weight (Mw) of the acrylic block copolymer (c) is too large (in particular, when it is larger than 300,000), for example, degradation in compatibility with an epoxy resin, degradation in handling properties and processability due to an increase in viscosity of the curable resin composition, and degradation in effect of improving a fracture toughness caused by macrophase separation after curing are liable to occur.

In addition, the weight average molecular weights (Mw) and the number average molecular weights (Mn) of the acrylic block copolymer and the individual polymer blocks forming the acrylic block copolymer of this specification are the weight average molecular weights (Mw) and the number average molecular weights (Mn) measured by a gel permeation chromatography (GPC) described in the following examples.

In order to obtain more excellent fracture toughness and peel adhesive strength of the cured resin obtained by curing the curable resin composition, the molecular weight distribution [ratio (Mw/Mn) of the weight average molecular weight (Mw) to the number average molecular weight (Mn)] of the acrylic block copolymer (c) used in the present invention is 1.5 or less [the above requirement ($\gamma$)], preferably 1.4 or less, more preferably 1.3 or less, and even more preferably 1.2 or less.

In the present invention, since a copolymer having a molecular weight distribution (Mw/Mn) of 1.5 or less and a uniform molecular weight is used as the acrylic block copolymer (c), the following advantages can be obtained.

That is, (1) when the curable resin composition of the present invention is cured, a cured resin having a microphase separation structure is likely to be formed in which the polymer block B in the acrylic block copolymer (c) forms a micro spherical structure and/or a micro linear structure having a uniform size and is dispersed in a matrix of the cured epoxy resin, and by this microphase separation structure, the shear adhesive strength of the cured resin is significantly improved as well as the fracture toughness and the peel adhesive strength, and in particular, in a cured resin having a microphase separation structure in which the block copolymer B is dispersed in the form of a micro linear structure, the fracture toughness, the peel adhesive strength, and the shear adhesive strength are further improved.

(2) Among the curable resin compositions of the present invention, in a curable resin composition forming a cured resin in which the polymer block B in the acrylic block copolymer (c) forms a micro linear structure and is dispersed in the matrix of the cured epoxy resin, a microphase separation structure is likely to be formed in which the micro linear structure of the polymer block B is dispersed in the matrix of the epoxy resin so as to be oriented in a predetermined direction (arranged toward a predetermined direction), and as a result, the fracture toughness, the peel adhesive strength, and the shear adhesive strength of the cured resin are further improved. Furthermore, since the orientation state is formed, the properties, such as the fracture toughness, the peel adhesive strength, and the shear adhesive strength, may exhibit anisotropy, and when the cured resin as described above is used, it is estimated to obtain particularly excellent properties in a certain direction. In addition, when cured resins in an orientation state are laminated so that the orientation directions thereof are intersected to each other, a laminate construction and/or a composite construction having an excellent strength in many directions can be formed.

(3) Even when processes and conditions for manufacturing the curable resin composition and the cured resin therefrom are varied to a certain extent, without receiving the influences thereof, the specific microphase separation structure described in the above (1) and (2) can be smoothly formed in the cured resin.

(4) The content ratio of the polymer block A having a high compatibility with an epoxy resin in the acrylic block copolymer (c) can be decreased (the content ratio of the polymer block B can be increased) so as to promote the formation of the specific microphase separation structure described in the above (1) and (2) in the cured resin, and as a result, a significant effect of improving a fracture toughness can be obtained.

(5) Regardless of whether the content of the acrylic block copolymer (c) in the curable resin composition is low or high, the specific microphase separation structure described in the above (1) is smoothly formed in the cured resin, and a cured resin having an excellent fracture toughness can be obtained, and in particular, when the content of the acrylic block copolymer (c) in the curable resin composition is increased, a microphase separation structure in which the polymer block B in the acrylic block copolymer (c) forms a micro linear structure and is dispersed in the matrix can be more easily formed, and hence a cured resin having more excellent fracture toughness, peel adhesive strength, and shear adhesive strength can be obtained.

When an acrylic block copolymer (such as poly(methyl methacrylate)-poly(butyl acrylate)-poly(methyl methacrylate)) having a molecular weight distribution of more than 1.5 as disclosed in the above-described conventional technique (for example, disclosed in Patent Document 4) is used, since a large amount of a low molecular weight component and a large amount of a high molecular weight component are contained, coarse separation of the high molecular weight component may occur in curing, and/or bleeding out of the low molecular weight component may occur in some cases. The coarse separation may cause a decrease in mechanical strength and the bleeding out may have an influence on an adhesion interface to decrease an adhesion force in some cases. On the other hand, in the present invention, since the acrylic block copolymer (c) having a molecular weight distribution (Mw/Mn) of 1.5 or less is used, the amounts of a low molecular weight component and a high molecular weight component are small, and in the cured resin of the curable resin composition, the acrylic block copolymer (c) is contained in the cured epoxy resin matrix while forming the specific microphase separation structure described in the above (1), so that the problems of coarse separation of the high molecular weight component of the acrylic block copolymer (c) and the bleeding our of the low molecular weight component thereof do not occur.

In the acrylic block copolymer (c) used in the present invention, the content ratio of the polymer block A based on the mass of the acrylic block copolymer (c) is 3 to 60 percent by mass [the above requirement (δ)], preferably 5 to 52 percent by mass, more preferably 10 to 45 percent by mass, and even more preferably 15 to 35 percent by mass.

Accordingly, in the acrylic block copolymer (c) used in the present invention, the content ratio of the polymer block B based on the mass of the acrylic block copolymer (c) may be set to 97 to 40 percent by mass, preferably 95 to 48 percent by mass, more preferably 90 to 55 percent by mass, and even more preferably 85 to 65 percent by mass.

Since the content ratio of the polymer block A in the acrylic block copolymer (c) is in the range described above, the compatibility with the epoxy resin (a) becomes preferable, and furthermore, the fracture toughness of the cured resin obtained by curing the curable resin composition also becomes excellent.

On the other hand, when the content ratio of the polymer block A is too high (in particular, more than 60 percent by mass), the viscosity may increase in some cases. By the increase in viscosity, for example, degradation in handling properties and processability and degradation of the improvement effect of the fracture toughness caused by the macrophase separation after curing are liable to occur. In addition, when the content ratio of the polymer block A is too high, the improvement effect of the fracture toughness of the cured resin is degraded.

On the other hand, when the content ratio of the polymer block A in the acrylic block copolymer (c) is too low (in particular, less than 3 percent by mass), the compatibility with the epoxy resin (a) is degraded.

A method for manufacturing the acrylic block copolymer (c) used in the present invention is not particularly limited, and any acrylic block copolymer which satisfies the above requirements (α) to (δ) may be used. The acrylic block copolymer (c) which satisfies the above requirements (α) to (δ) may be manufactured by a method in accordance with a known manufacturing method.

As a method for obtaining a block copolymer having a narrow molecular weight distribution, a method for performing living polymerization of a monomer which forms a structural unit of a polymer is generally used. As the living polymerization method, for example, there may be mentioned a polymerization method using an organic rare earth metal complex as a polymerization initiator (see Patent Document 5), a method in which anion polymerization is performed in the presence of a mineral acid salt, such as a salt of an alkali metal or an alkaline earth metal, using an organic alkali metal compound as a polymerization initiator (see Patent Document 6), a method in which anion polymerization is performed in the presence of an organic aluminum compound using an organic alkali metal compound as a polymerization initiator (see Patent Document 7), and an atomic transfer radical polymerization method (ATRP) (see Non-Patent Document 3).

Among the manufacturing methods described above, in the case of the anion polymerization method using an organic aluminum compound as a co-catalyst, since deactivation is not likely to occur in polymerization, a homopolymer functioning as a deactivation component is not so much mixed in, and hence when the acrylic block copolymer (c) formed by this method is added to an epoxy resin, excellent heat resistance and elastic modulus inherent in the epoxy resin are not so much adversely influenced. Furthermore, in the acrylic block copolymer (c) obtained by this method, the polymer block A has a high syndiotactic molecular structure, and since the glass transition temperature thereof is higher than that having an isotactic molecular structure, the heat resistance is excellent. Furthermore, in the case of this method, since living polymerization can be performed under relatively moderate temperature conditions, when the acrylic block copolymer (c) is industrially manufactured, the load (primarily, electrical power applied to refrigerating machines to control the polymerization temperature) on the environment can be advantageously reduced. Accordingly, in consideration of the points described above, the acrylic block copolymer (c) used in the present invention is preferably manufactured by an anion polymerization method using an organic aluminum compound as a co-catalyst.

The above anion polymerization in the presence of an organic aluminum compound, which is preferably used as a polymerization method for manufacturing the acrylic block copolymer (c) used in the present invention, is performed by polymerizing an alkyl methacrylate and an alkyl acrylate in the presence of, for example, an organic lithium compound and an organic aluminum compound represented by the following general formula:

$$AlR^1R^2R^3$$

(in the formula, $R^1$, $R^2$, $R^3$ each independently indicate an alkyl group, a cycloalkyl group, an aryl group, an aralkyl group, an alkoxyl group, or an aryloxy group, each of which may have a substituent, or an N,N-disubstituted amino group, or alternatively, $R^1$ indicates one of the groups mentioned above, and $R^2$ and $R^3$ collectively indicate an arylenedioxy group which may have a substituent), and in addition, whenever necessary, an ether, such as dimethyl ether, dimethoxyethane, diethoxyethane, or 12-crown-4, or a nitrogen-containing compound, such as triethylamine, N,N,N',N'-tetramethylethylenediamine, N,N,N',N",N"-pentamethyldiethylenetriamine, 1,1,4,7,10,10-hexamethyltriethylenetetramine, pyridine, or 2,2-dipyridyl, may be further provided in a reaction system.

In this case, as the organic lithium compound mentioned above, at least one of the following compounds may be used, and for example, they are alkyl lithiums and alkyl dilithiums, such as methyl lithium, ethyl lithium, n-propyl lithium, isopropyl lithium, n-butyl lithium, sec-butyl lithium, isobutyl lithium, tert-butyl lithium, n-pentyl lithium, n-hexyl lithium, tetramethylene dilithium, pentamethylene dilithium, and hexamethylene dilithium; aryl lithiums and aryl dilithiums, such as phenyl lithium, m-tolyl lithium, p-tolyl lithium, xylyl lithium, and lithium naphthalene; aralkyl lithiums and aralkyl dilithiums, such as benzyl lithium, diphenylmethyl lithium, trityl lithium, 1,1-diphenyl-3-methylpentyl lithium, α-methylstyryl lithium, and a dilithium produced by a reaction between diisopropenylbenzene and butyl lithium; lithium amides, such as lithium dimethylamide, lithium diethylamide, and lithium diisopropylamide; lithium alkoxides, such as methoxy lithium, ethoxy lithium, n-propoxy lithium, isopropoxy lithium, n-butoxy lithium, sec-butoxy lithium, tert-butoxy lithium, pentyloxy lithium, hexyloxy lithium, heptyloxy lithium, octyloxy lithium, phenoxy lithium, 4-methylphenoxy lithium, benzyloxy lithium, and 4-methylbenzyloxy lithium.

In addition, as the organic aluminum compound represented by the above general formula, at least one of the following compounds may be used, and for example, they are trialkyl aluminums, such as trimethyl aluminum, triethyl aluminum, triisobutyl aluminum, and tri-n-octyl aluminum; dialkylphenoxy aluminums, such as dimethyl(2,6-di-tert-butyl-4-methylphenoxy)aluminum, dimethyl(2,6-di-tert-butylphenoxy)aluminum, diethyl(2,6-di-tert-butyl-4-methylphenoxy)aluminum, diethyl(2,6-di-tert-butylphenoxy)aluminum, diisobutyl(2,6-di-tert-butyl-4-methylphenoxy)aluminum, and diisobutyl(2,6-di-tert-butylphenoxy)aluminum; alkyldiphenoxy aluminums, such as methyl-bis-(2,6-di-tert-butyl-4-methylphenoxy)aluminum, methyl-bis-(2,6-di-tert-butylphenoxy)aluminum, ethyl[2,2'-methylene-bis-(4-methyl-6-tert-butylphenoxy)]aluminum, ethyl-bis-(2,6-di-tert-butyl-4-methylphenoxy)aluminum, ethyl-bis-(2,6-di-tert-butylphenoxy)aluminum, ethyl[2,2'-methylene-bis-(4-methyl-6-tert-butylphenoxy)]aluminum, isobutyl-bis-(2,6-di-tert-butyl-4-methylphenoxy)aluminum, isobutyl-bis-(2,6-di-tert-butylphenoxy)aluminum, and isobutyl[2,2'-methylene-bis-(4-methyl-6-tert-butylphenoxy)]aluminum; alkoxydiphenoxy aluminums, such as methoxy-bis-(2,6-di-tert-butyl-4-methylphenoxy)aluminum, methoxy-bis-(2,6-di-tert-butylphenoxy)aluminum, methoxy[2,2'-methylene-bis-(4-methyl-6-tert-butylphenoxy)]aluminum, ethoxy-bis-(2,6-di-tert-butyl-4-methylphenoxy)aluminum, ethoxy-bis-(2,6-di-tert-butylphenoxy)aluminum, ethoxy[2,2'-methylene-bis-(4-methyl-6-tert-butylphenoxy)]aluminum, isopropoxy-bis-(2,6-di-tert-butyl-4-methylphenoxy)aluminum, isopropoxy-bis-(2,6-di-tert-butylphenoxy)aluminum, and isopropoxy-bis-[2,2'-methylene-bis-(4-methyl-6-tert-butylphenoxy)]aluminum; and triphenoxy aluminums, such as tris-(2,6-di-tert-butyl-4-methylphenoxy)aluminum and tris-(2,6-diphenylphenoxy)aluminum. Among these organic aluminum compounds mentioned above, for example, isobutyl-bis-(2,6-di-tert-butyl-4-methylphenoxy)aluminum, isobutyl-bis-(2,6-di-tert-butylphenoxy)aluminum, and isobutyl[2,2'-methylene-bis-(4-methyl-6-tert-butylphenoxy)]aluminum are particularly preferably used since handling thereof can be easily performed, and furthermore polymerization of an acrylic acid ester can be advanced under relatively mild temperature conditions without causing deactivation.

In order to increase the adhesive strength to a substrate and to obtain an excellent fracture toughness of the cured resin, the curable resin composition of the present invention contains, with respect to 100 parts by mass of the epoxy resin (a), 1 to 70 parts by mass of the epoxy resin curing agent (b) and the 1 to 50 parts by mass of the acrylic block copolymer (c).

With respect to 100 parts by mass of the epoxy resin (a), the curable resin composition of the present invention preferably contains 5 to 60 parts by mass of the epoxy resin curing agent (b) and more preferably contains 35 to 60 parts by mass thereof.

In addition, with respect to 100 parts by mass of the epoxy resin (a), the curable resin composition of the present invention contains preferably 5 to 50 parts by mass of the acrylic block copolymer (c), more preferably 7 to 45 parts by mass, even more preferably 10 to 40 parts by mass, further preferably 12 to 35 parts by mass, and particularly preferably 15 to 30 parts by mass.

Although the curable resin composition of the present invention may or may not contain the curing accelerator (d), when the curing accelerator (d) is contained, the curing temperature and/or the curing time may be decreased thereby, and the handling properties and processability can be improved; hence, with respect to 100 parts by mass of the epoxy resin, the curing accelerator (d) is preferably contained in an amount of 0.01 to 20 parts by mass, more preferably in an amount of 0.1 to 10 parts by mass, and particularly preferably in an amount of 0.2 to 5 parts by mass.

Besides the epoxy resin (a), the epoxy resin curing agent (b), the acrylic block copolymer (c), and the curing accelerator (d) which is added depending on the case, whenever necessary, the curable resin composition of the present invention may contain various types of additives as long as the advantages of the present invention are not degraded. As the additives as described above, for example, an antifoaming agent, a rheology adjuster, a flame retardant, a filler, a polymerization inhibitor, a pigment, a dye, a coupling agent, an ion trapping agent, and a mold release agent may be mentioned.

In addition, whenever necessary, as a reinforcing fiber, the curable resin composition of the present invention may contain a glass fiber, a carbon fiber, a graphite fiber, an aramide fiber, a boron fiber, an alumina fiber, a silicon carbide fiber, or the like.

A method for preparing the curable resin composition of the present invention is not particularly limited, and any preparation method capable of uniformly mixing the epoxy resin (a), the epoxy resin curing agent (b), the acrylic block copolymer (c), the curing accelerator which is added when needed, and other components may be used and is not particularly limited. For example, the curable resin composition of the present invention can be prepared by using a method (1) including the steps of supplying the epoxy resin (a) in a reactor, heating the epoxy resin (a) if it is a solid to an appropriate temperature to form a liquid, adding the acrylic block copolymer (c) thereto to form a complete solution, adding the epoxy resin curing agent (b) thereto together with, whenever necessary, the curing accelerator (d), uniformly mixing the liquid, and if needed, performing a defoaming treatment to prepare a curable resin composition; a method (2) in which after the epoxy resin (a), the epoxy resin curing agent (b), the acrylic block copolymer (c), the curing accelerator which is added when needed, and other components are uniformly mixed together by a mixer or the like, melt compounding is performed using a heat roll machine, a biaxial extruder, a kneader, or the like to prepare a curable resin composition; and a method (3) in which the epoxy resin (a), the epoxy resin curing agent (b), the acrylic block copolymer (c), the curing accelerator which is added when needed, and other components are dissolved in a solvent, such as methyl ethyl ketone, acetone, or toluene, to prepare a curable resin composition in the form of varnish. In this case, when the epoxy resin curing agent (b) is added to a mixture of the epoxy resin (a) and the acrylic block copolymer (c), since the curing reaction starts, a step after the epoxy resin curing agent (b) is added is preferably performed in a short time as fast as possible.

The curable resin composition of the present invention obtained as described above forms a cured resin which maintains excellent heat resistance and elastic modulus inherent in a cured epoxy resin, and further which is strongly adhered to various substrates, is excellent in fracture toughness, is strong, is hardly fractured, and is excellent in durability. Hence, by using the properties described above, the curable resin composition of the present invention is preferably used as a sealing material for electric and electronic materials, a laminate for electrical use such as a printed circuit board, an automobile component, a structure adhesive, an electrical insulating material, a coating material, a material for civil engineering and construction, and a matrix resin represented, for example, by a fiber reinforced composite material for sport application, aircraft materials, and the like.

When the cured resin is manufactured using the curable resin composition of the present invention, any conventionally used method for curing an epoxy resin composition may be used.

When the curable resin composition of the present invention is cured, any method, such as a heat curing method, an energy-ray curing method (such as an electron beam curing method or an ultraviolet curing method), or a moisture curing method may be used, and among these mentioned above, a heat curing method is preferably used.

When the curable resin composition of the present invention is a solid at ordinary temperature, for example, after pulverization and pelletizing thereof are performed, a cured resin (cured molded product) can be manufactured by cure molding using a conventional molding method, such as transfer molding, compression molding, or injection molding.

In addition, when the curable resin composition of the present invention is a liquid or a varnish at ordinary temperature, for example, after an appropriate method is performed such that the curable resin composition of the present invention is charged into a mold (molding), is poured into a container (potting or the like), is applied on a substrate (lamination), or is impregnated in fibers (filaments) or the like (filament winding or the like), heat curing is performed, so that a cured resin in accordance with each application or the like can be obtained.

After cast molding, potting, coating, impregnation into fibers, or the like is performed, whenever necessary, when the curable resin composition in the form of a liquid or a varnish at ordinary temperature is heated and/or dried so as to be placed in a semi-cured state (B stage), tacky properties are suppressed, and hence the workability can be improved. In addition, the curable resin composition of the present invention in the form of a varnish may be formed into a film shape by applying it on a carrier film using a coating apparatus, such as a comma coater, a die coater, or a gravure coater, followed by drying and curing, or may be used after vacuum defoaming.

Although the curing temperature and the curing time to cure the curable resin composition of the present invention may be changed depending on types of epoxy resin (a), epoxy resin curing agent (b), and the like, for example, a curing temperature of 20° C. to 250° C. and a curing time of 1 to 24 hours may be used.

When heat curing of the curable resin composition is gradually performed by multiple steps, the surface of the cured resin becomes clear and fine, and furthermore, the microphase separation structure as described in the above (1) is likely to be formed in the cured resin.

For example, when the curable resin composition is heat-cured by two stages, a method is preferably used in which a precure is performed at a curing temperature of 20° C. to 160° C. for a curing time of 1 to 5 hours, and subsequently, a postcure is performed at a curing temperature of 130° C. to 250° C. for a curing time of 1 to 3 hours.

The cured resin of the present invention obtained by curing the curable resin composition of the present invention may have a macrophase separation structure and a microphase separation structure; however, the cured resin preferably has a microphase separation structure since an excellent adhesive strength to a substrate and an excellent fracture toughness of the cured resin are obtained.

The "macrophase separation structure" in this specification indicates the structure in which different types of polymer components each having a macro size (in general, 1 to 1,000 µm) are mixed together without being compatible with each other. On the other hand, the "microphase separation structure" indicates the structure in which different types of polymer components having a micro size [in general, the diameter [when a spherical structure or a particle structure is formed, the diameter (maximum diameter) of a spherical structural body or a particle structural body is 1 to 500 nm, and when a linear structure is formed, the diameter (maximum diameter) of a linear structural body is 1 to 500 nm] are mixed together without being compatible with each other.

The microphase separation structure in the cured resin can be observed by the methods described in the following examples using a scanning probe microscope, a scanning electron microscope, a transmission electron microscope, or the like.

When the cured resin of the present invention has a microphase separation structure, the microphase separation structure may has, for example, a microphase separation structure, such as a micro spherical structure, a micro lamella structure, a micro linear structure, and a mixture of at least two thereof. When the cured resin of the present invention has a microphase separation structure in which a micro spherical structure is formed and is dispersed, it is preferable that the polymer block B in the acrylic block copolymer (c) forms a micro spherical structure having a uniform size and is uniformly dispersed in the matrix.

In order to form a cured resin having an excellent adhesive strength to a substrate and further having an excellent fracture toughness, the cured resin of the present invention preferably has, among the microphase separation structures mentioned above, "a microphase separation structure in which the block copolymer B in the acrylic block copolymer (c) forms a micro linear structure and is dispersed in the matrix of the cured epoxy resin". In this case, the polymer block B in the acrylic block copolymer (c) in the form of a micro linear structure may be randomly dispersed in the matrix of the cured epoxy resin or may be dispersed therein so as to be oriented in a predetermined direction. In particular, when the polymer block B in the acrylic block copolymer (c) in the form of a micro linear structure is dispersed in the epoxy resin matrix so as to be oriented in a predetermined direction (arranged in a predetermined direction), the fracture toughness and the peel adhesive strength of the cured resin are further improved.

In general, in the curable resin composition of the present invention, as the content of the acrylic block copolymer (c) is increased, the microphase separation structure in which the polymer block B in the acrylic block copolymer (c) forms a micro linear structure and is dispersed in the cured resin is likely to be formed.

In addition, as the content of the polymer block B in the acrylic block copolymer (c) is increased, the microphase separation structure in which the polymer block B in the acrylic block copolymer (c) forms a micro linear structure and is dispersed in the cured resin is likely to be formed.

In addition, when an acrylic block copolymer (c) having a high weight average molecular weight (Mw) is used, compared to the case in which an acrylic block copolymer (c) having a low weight average molecular weight (Mw) is used, a clear microphase separation structure in which a micro liner structural body is dispersed is easily formed, and even when the content of the block copolymer B is low, the polymer block B may form a micro linear structure in the cured resin in some cases.

In addition, among the cured resins of the present invention, in the cured resin in which the polymer block B in the acrylic block copolymer (c) forms a micro linear structure and is dispersed in the matrix of the cured epoxy resin, in general, as the weight average molecular weight (Mw) of the acrylic block copolymer (c) is increased, or as the content ratio of the polymer block A (hard segment) in the acrylic block copolymer (c) is decreased, a micro linear structural body formed from the polymer block B is oriented in a predetermined direction (arranged in a predetermined direction) and is easily dispersed in the matrix. Accordingly, when the content of the polymer block A (hard segment) in the acrylic block copolymer (c) is high, in order to form a microphase separation structure in which the micro linear structural body is dispersed and is oriented in a predetermined direction, in general, the weight average molecular weight (Mw) of the acrylic block copolymer (c) is required to be increased.

When the cured resin of the present invention has the microphase separation structure in which the polymer block B in the acrylic block copolymer (c) forms a micro linear structure and is dispersed in the epoxy resin matrix, the micro linear structural body formed from the polymer block B may be a continuous linear structural body, an intermittent (discontinuous) linear structural body, or a mixture of a continuous linear structural body and an intermittent linear structural body. In addition, the linear structural body may be either linear or curved.

In addition, the "micro linear structure" in this specification generally indicate the case in which in the micro linear structural body formed from the polymer block B in the acrylic block copolymer (c), when the length of each linear structural body is divided by the diameter thereof, the value (length/diameter) is 3 or more.

In this case, the diameter of each micro linear structural body is preferably 1 to 300 nm, more preferably 5 to 100 nm, and even more preferably 10 to 70 nm.

The microphase separation structure of the cured resin of the present invention can be observed as described in the following examples using a scanning electron microscope (SEM), a transmission electron microscope (TEM), a scanning probe microscope (AFM), or the like.

In the observation using the microscopes mentioned above, when a linear microphase separation oriented as in the present invention is formed, since a spherical structure may be observed when viewed from only one cut surface, for observation of a linear microphase separation structure, as shown in FIG. 1, observation is preferably performed on at least two cut surfaces orthogonal to each other. In addition, the observation using two cut surfaces as described above is preferably performed at several positions of the same sample.

In the cured resin of the present invention having the microphase separation structure as described above, it is estimated that the polymer block A in the acrylic block copolymer (c) is compatible with the epoxy resin matrix which is cured so as to protrude outside the micro linear structural body formed from the polymer block B.

The fracture toughness value of the cured resin of the present invention may be determined, for example, in accordance with the application of the cured resin. In order to obtain a high fracture toughness, the cured resin of the present invention preferably has a fracture toughness value (K1c) of 1.6 MPa·m$^{1/2}$ or more, more preferably 1.8 MPa·m$^{1/2}$ or more, even more preferably 2.1 MPa·m$^{1/2}$ or more, and particularly preferably 2.3 to 5.0 MPa·m$^{1/2}$, the fracture toughness value (K1c) being calculated by a Single Edge Notched Bending (SENB) test in accordance with ASTM D5045-91.

Furthermore, although the adhesive strength of the cured resin of the present invention to a substrate may be changed in accordance with the type of substrate, application of a composite formed between a substrate and the cured resin, usage mode, and the like, in order to obtain an appropriate peel adhesive strength, the peel adhesive strength to an aluminum plate at a peeling rate of 100 mm/min by a test in accordance with JIS K 6854-3 is preferably 10 N/25 mm or more, more preferably 15 N/25 mm or more, and even more preferably 30 to 200 N/25 mm.

The cured resin of the present invention can be preferably used as a structural adhesive layer or a sealing material layer. In particular, for example, the cured resin can be used as a structural adhesive layer or a sealing material layer which is used to protect and strengthen interconnections between a substrate and many types of electronic circuit devices, such as a transistor, assembled in an integrated circuit (IC) chip and/or electronic devices, such as a resistor and capacitor.

When the curable resin composition of the present invention is used as an adhesive, either a one-component type or a two-component type may be formed, and in addition, either a hot melt type or a solvent type may also be formed. In addition, a multilayer structure may be formed from the curable resin composition with a sheet or a film so as to be used in the form of a tape. The curable resin composition of the present invention may also be used as a so-called adhesive which functions as a tacking agent used for positioning before the resin composition is cured and as an adhesive when it is cured. In particular, for example, the curable resin composition of the present invention may be applied to a helical mating surface of a screw, a bolt, or a nut for preventing looseness in screwing and for air-tight sealing or may be preferably used, for example, for adhesion between constituent members of home electronics and electronic devices and between the same or different types of materials, such as various metals, composite materials, and polymers, used for mechanical constructions and vehicle constructions, such as aircrafts, railroad vehicles, and automobiles.

In addition, a fiber-reinforced composite material which is a cured resin using the curable resin composition of the present invention as a matrix resin is preferably used in sport application, aircraft application, and general industrial application. In particular, in aerospace application, the fiber-reinforced composite material is preferably used for aircraft primary structural member application, such as a main wing, a tail wing, and a floor beam; for aircraft secondary structural member application, such as a flap, an aileron, a cowl, a fairing and an interior material; and for a rocket motor case and artificial satellite structural material application. In addition, in the sport application, the fiber-reinforced composite material is preferably used, for example, for a gold shaft, a fishing rod, rackets for tennis, badminton, squash, and the like, sticks for hockey and the like, bats for baseball, softball, and the like, frames for bicycles, and sky poles. Furthermore, in the general industrial application, the fiber-reinforced composite material is preferably used, for example, for structural material of mobiles such as an automobile, a ship, and a railroad vehicle; for a driveshaft, a leaf spring, a windmill blade, a pressure vessel, a flywheel, a roller for paper making, a roofing material, a cable, and a reinforcing bar; and for a civil engineering/building application such as a repairing/reinforcing material.

EXAMPLES

Hereinafter, the present invention will be described in detail with reference to examples and the like; however, the present invention is not limited to the following examples.
(I) Synthesis of Acrylic Block Copolymer In Synthesis Examples 1 to 5 described below, acrylic block copolymers (c-1), (c-2), (c-3), (c-4), and (c-5) used in the following examples were synthesized.

The syntheses of the acrylic block copolymers (c-1), (c-2), (c-3), (c-4), and (c-5) were carried out in accordance with Synthesis Examples 1 to 5 described below using chemicals which were purified and dried by ordinary methods.

In this stage, the weight average molecular weight (Mw), the number average molecular weight (Mn), the molecular weight distribution (Mw/Mn), the content ratio of the polymer block A (poly(methyl methacrylate) block) and that of the polymer block B (poly(butyl acrylate) block), the tacticity (rr) of the polymer block A, the glass transition temperature of the polymer block A and that of the polymer block B (poly(butyl acrylate) block), and a polymerization conversion rate of each monomer of each of the acrylic block copolymers (c-1), (c-2), (c-3), (c-4), and (c-5) thus synthesized and a commercially available acrylic block copolymer ["Nanostrength" (registered trademark) M22 manufactured by Arkema; triblock copolymer of poly(methyl methacrylate)-poly(butyl acrylate)-poly(methyl methacrylate), hereinafter referred to as "acrylic block copolymer (M22)"] used in Comparative Examples 4, 5, and 7 were obtained by the following methods.
(I-1) Measurement of Weight Average Molecular Weight (Mw), Number Average Molecular Weight (Mn), and Molecular Weight Distribution (Mw/Mn) of Acrylic Block Copolymer By using the following apparatus and the following method and conditions thereof, the weight average molecular weight (Mw) and the number average molecular weight (Mn) of the acrylic block copolymer were measured by a gel permeation chromatograph (GPC), and the molecular weight distribution (Mw/Mn) was obtained from the values thereof.
[Apparatus and Measurement Conditions]
Apparatus: Gel permeation chromatograph (HLC-8020) manufactured by Toso Corp.
Column: TSKgel GMHXL, G4000HXL, and G5000HXL connected in series, manufactured by Toso Corp.
Eluting agent: Tetrahydrofuran
Flow rate of eluting agent: 1.0 ml/min
Column temperature: 40° C.
Detection method: Differential refractive index (RI)
Calibration curve: formed using standard polystyrene
(I-2) Content Ratio of Polymer Block A in Acrylic Block Copolymer Measurement of the content of each copolymer component of the acrylic block copolymer by a proton nuclear magnetic resonance ($^1$H-NMR) spectroscopy using the following apparatus and method.
[Apparatus and Method]
Apparatus: Nuclear magnetic resonance apparatus (JNM-LA400) manufactured by JEOL Ltd.
solvent: Deuterated chloroform
In the $^1$H-NMR spectrum, signals in the vicinities of 3.6 ppm and 4.0 ppm were attributed to an ester group ($-$O$-$CH$_3$) of a methyl methacrylate unit and an ester group $-$O$-$CH$_2$$-$CH$_2$$-$CH$_2$$-$CH$_3$) of an n-butyl acrylate unit, respectively, and the content of the copolymer component was obtained by the ratio between the integrated values thereof.
(I-3) Tacticity (rr) of Polymer Block A The tacticity (rr) of the polymer block A (poly(methyl methacrylate) block) in the acrylic block copolymer was analyzed by a carbon nuclear magnetic resonance ($^{13}$C-NMR) spectroscopy using the following apparatus and method.
[Apparatus and Method]
Apparatus: Nuclear magnetic resonance apparatus (JNM-LA400) manufactured by JEOL Ltd.
Solvent: Deuterated chloroform
In the $^{13}$C-NMR spectrum, signals in the vicinities of 44.5 ppm, 44.8 ppm, and 45.5 ppm were attributed to quaternary carbons of the methyl methacrylate polymer block and corresponded to tacticities rr, mr, and mm, respectively, and the tacticity rr was obtained by the ratio between the integrated values thereof. In the block copolymers used in the examples of the present invention and comparative examples, since it was difficult to discriminate a signal derived from a methyl methacrylate polymer from a signal derived from an n-butyl acrylate polymer by a $^1$H-NMR method, analysis by a $^{13}$C-NMR method was used.
(I-4) Glass Transition Temperature (Tg) of Each Polymer Block of Acrylic Block Copolymer By using the following apparatus and method, in a curve obtained by DSC measurement, an extrapolation onset temperature (Tgi) was regarded as the glass transition temperature (Tg).
[Apparatus and Method]
DSC measurement apparatus: "DSC-822" manufactured by Mettler
Condition: temperature rise rate: 10° C./min
(I-5) Polymerization Conversion Rate of Charged Monomer By using the following apparatus and method, the polymerization conversion rate of a charged monomer was measured using a gas chromatography (GC).
[Apparatus and Method]
GC apparatus: gas chromatograph "GC-14A" manufactured by Shimadzu Corp.
Column: "INERT CAP 1" manufactured by GL Sciences Inc. (df=0.4 μm, 0.25 mm I.D.×60 m)
Analytical condition: Injection 300° C., detector 300° C., 60° C. (held for 0 minute)→5° C./min→100° C. (held for 0 minute)→15° C./min→300° C. (held for 2 minute)

Synthesis Example 1

Synthesis of Acrylic Block Copolymer (c-1)

(1) After a three-way cock was fitted to a three-necked flask having a volume of 2 L, and the inside thereof was replaced with nitrogen, 868 g of toluene, 43.4 g of 1,2-dimethoxyethane, and 60.0 g of a toluene solution containing 40.2 mmol of isobutyl-bis-(2,6-di-t-butyl-4-methylphenoxy) aluminum was added in the flask at room temperature, and 1.18 g of a mixed solution of cyclohexane and n-hexane containing 2.05 mmol of sec-butyl lithium was further added. Next, 46.8 g of methyl methacrylate was added thereto. A reaction solution exhibited yellow at the beginning and was turned into colorless after stirring at room temperature for 60 minutes. At this stage, the polymerization conversion rate of methyl methacrylate was 99.9% or more. Subsequently, after the inside temperature of a polymerization solution was cooled to −30° C., and 218 g of n-butyl acrylate was dripped for 2 hours, stirring was performed at −30° C. for 5 minutes. At this stage, the polymerization conversion rate of n-butyl acrylate was 99.9% or more. Furthermore, after 46.8 g of methyl methacrylate was added, and stirring was performed at room temperature for one night, 3.50 g of methanol was added, so that the polymerization reaction was stopped. At this stage, the polymerization conversion rate of methyl methacrylate was 99.9% or more. The reaction solution thus obtained was poured to 6.4 kg of methanol, and a white precipitate was separated. Next, the white precipitate was recovered by filtration, followed by drying, so that 303 g of a triblock copolymer [acrylic block copolymer (c-1)] was obtained.

(2) $^1$H-NMR measurement and GPC measurement were performed on the acrylic block copolymer (c-1) obtained in the above (1) by the methods described above, and according to the results thereof, it was found that the acrylic block copolymer (c-1) was a triblock copolymer of poly(methyl methacrylate)-poly(n-butyl acrylate)-poly(methyl methacrylate), the weight average molecular weight (Mw) was 161,000, the number average molecular weight (Mn) was 126,000, and the molecular weight distribution (Mw/Mn) was 1.28.

In addition, as for the content ratios of the individual polymer blocks in the acrylic block copolymer (c-1), the methyl methacrylate polymer block (polymer block A) was 30.0 percent by mass, and the n-butyl acrylate polymer block (block copolymer B) was 70.0 percent by mass.

(3) In addition, when the glass transition temperatures of the individual block copolymers of the acrylic block copolymer (c-1) obtained in the above (1) and the tacticity (rr) of the methyl methacrylate block (polymer block A) were obtained by the methods described above, the results were as shown in the following Table 1.

Synthesis Example 2

Synthesis of Acrylic Block Copolymer (c-2)

(1) After a three-way cock was fitted to a three-necked flask having a volume of 2 L, and the inside thereof was replaced with nitrogen, 868 g of toluene, 43.4 g of 1,2-dimethoxyethane, and 60.0 g of a toluene solution containing 40.2 mmol of isobutyl-bis-(2,6-di-t-butyl-4-methylphenoxy) aluminum was added in the flask at room temperature, and 3.68 g of a mixed solution of cyclohexane and n-hexane containing 6.37 mmol of sec-butyl lithium was further added. Next, 49.9 g of methyl methacrylate was added thereto. A reaction solution exhibited yellow at the beginning and was turned into colorless after stirring at room temperature for 60 minutes. At this stage, the polymerization conversion rate of methyl methacrylate was 99.9% or more. Subsequently, after the inside temperature of a polymerization solution was cooled to −30° C., and 212 g of n-butyl acrylate was dripped for 2 hours, stirring was performed at −30° C. for 5 minutes. At this stage, the polymerization conversion rate of n-butyl acrylate was 99.9% or more. Furthermore, after 49.9 g of methyl methacrylate was added, and stirring was performed at room temperature for one night, 3.50 g of methanol was added, so that the polymerization reaction was stopped. At this stage, the polymerization conversion rate of methyl methacrylate was 99.9% or more. The reaction solution thus obtained was poured to 15 kg of methanol, and a white precipitate was separated. Next, the white precipitate was recovered by filtration, followed by drying, so that 310 g of a triblock copolymer [acrylic block copolymer (c-2)] was obtained.

(2) $^1$H-NMR measurement and GPC measurement were performed on the acrylic block copolymer (c-2) obtained in the above (1), and according to the results thereof, it was found that the acrylic block copolymer (c-2) was a triblock copolymer of poly(methyl methacrylate)-poly(n-butyl acrylate)-poly(methyl methacrylate), the weight average molecular weight (Mw) was 63,000, the number average molecular weight (Mn) was 50,000, and the molecular weight distribution (Mw/Mn) was 1.26. In addition, as for the content ratios of the individual polymer blocks in the acrylic block copolymer (c-2), the methyl methacrylate polymer block (polymer block A) was 32.0 percent by mass, and the n-butyl acrylate polymer block (block copolymer B) was 68.0 percent by mass.

(3) In addition, when the glass transition temperatures of the individual block copolymers of the acrylic block copolymer (c-2) obtained in the above (1) and the tacticity (rr) of the methyl methacrylate block (polymer block A) were obtained by the methods described above, the results were as shown in the following Table 1.

Synthesis Example 3

Synthesis of Acrylic Block Copolymer (c-3)

(1) After a three-way cock was fitted to a three-necked flask having a volume of 2 L, and the inside thereof was replaced with nitrogen, 868 g of toluene, 43.4 g of 1,2-dimethoxyethane, and 60.0 g of a toluene solution containing 40.2 mmol of isobutyl-bis-(2,6-di-t-butyl-4-methylphenoxy) aluminum was added in the flask at room temperature, and 1.80 g of a mixed solution of cyclohexane and n-hexane containing 3.06 mmol of sec-butyl lithium was further added. Next, 50.3 g of methyl methacrylate was added thereto. A reaction solution exhibited yellow at the beginning and was turned into colorless after stirring at room temperature for 60 minutes. At this stage, the polymerization conversion rate of methyl methacrylate was 99.9% or more. Subsequently, after the inside temperature of a polymerization solution was cooled to −30° C., and 224 g of n-butyl acrylate was dripped for 2 hours, stirring was performed at −30° C. for 5 minutes. At this stage, the polymerization conversion rate of n-butyl acrylate was 99.9% or more. Furthermore, after 50.3 g of methyl methacrylate was added, and stirring was performed at room temperature for one night, 3.50 g of methanol was added, so that the polymerization reaction was stopped. At this stage, the polymerization conversion rate of methyl methacrylate was 99.9% or more. The reaction solution thus obtained was poured to 15 kg of methanol, and a white precipitate was separated. Next, the white precipitate was recovered by filtration, followed by drying, so that 320 g of a triblock copolymer [acrylic block copolymer (c-3)] was obtained.

(2) $^1$H-NMR measurement and GPC measurement were performed on the acrylic block copolymer (c-3) obtained in the above (1), and according to the results thereof, it was found that the acrylic block copolymer (c-3) was a triblock copolymer of poly(methyl methacrylate)-poly(n-butyl acrylate)-poly(methyl methacrylate), the weight average molecular weight (Mw) was 132,000, the number average molecular weight (Mn) was 101,000, and the molecular weight distribution (Mw/Mn) was 1.31. In addition, as for the content ratios of the individual polymer blocks in the acrylic block copolymer (c-3), the methyl methacrylate polymer block (polymer block A) was 31.3 percent by mass, and the n-butyl acrylate polymer block (block copolymer B) was 68.7 percent by mass.

(3) In addition, when the glass transition temperatures of the individual block copolymers of the acrylic block copolymer (c-3) obtained in the above (1) and the tacticity (rr) of the methyl methacrylate block (polymer block A) were obtained by the methods described above, the results were as shown in the following Table 1.

Synthesis Example 4

Synthesis of Acrylic Block Copolymer (c-4)

(1) After a three-way cock was fitted to a three-necked flask having a volume of 2 L, and the inside thereof was replaced with nitrogen, 868 g of toluene, 43.4 g of 1,2-dimethoxyethane, and 60.0 g of a toluene solution containing 40.2 mmol of isobutyl-bis-(2,6-di-t-butyl-4-methylphenoxy) aluminum was added in the flask at room temperature, and 1.80 g of a mixed solution of cyclohexane and n-hexane containing 3.06 mmol of sec-butyl lithium was further added. Next, 83.0 g of methyl methacrylate was added thereto. A reaction solution exhibited yellow at the beginning and was turned into colorless after stirring at room temperature for 60 minutes. At this stage, the polymerization conversion rate of methyl methacrylate was 99.9% or more. Subsequently, after the inside temperature of a polymerization solution was cooled to −30° C., and 158 g of n-butyl acrylate was dripped for 2 hours, stirring was performed at −30° C. for 5 minutes. At this stage, the polymerization conversion rate of n-butyl acrylate was 99.9% or more. Furthermore, after 83.0 g of methyl methacrylate was added, and stirring was performed at room temperature for one night, 3.50 g of methanol was added, so that the polymerization reaction was stopped. At this stage, the polymerization conversion rate of methyl methacrylate was 99.9% or more. The reaction solution thus obtained was poured to 15 kg of methanol, and a white precipitate was separated. Next, the white precipitate was recovered by filtration, followed by drying, so that 319 g of a triblock copolymer [acrylic block copolymer (c-4)] was obtained.

(2) $^1$H-NMR measurement and GPC measurement were performed on the acrylic block copolymer (c-4) obtained in the above (1), and according to the results thereof, it was found that the acrylic block copolymer (c-4) was a triblock copolymer of poly(methyl methacrylate)-poly(n-butyl acrylate)-poly(methyl methacrylate), the weight average molecular weight (Mw) was 137,000, the number average molecular weight (Mn) was 112,000, and the molecular weight distribution (Mw/Mn) was 1.22. In addition, as for the content ratios of the individual polymer blocks in the acrylic block copolymer (c-4), the methyl methacrylate polymer block (polymer block A) was 51.4 percent by mass, and the n-butyl acrylate polymer block (block copolymer B) was 48.6 percent by mass.

(3) In addition, when the glass transition temperatures of the individual block copolymers of the acrylic block copolymer (c-4) obtained in the above (1) and the tacticity (rr) of the methyl methacrylate block (polymer block A) were obtained by the methods described above, the results were as shown in the following Table 1.

Synthesis Example 5

Synthesis of Acrylic Block Copolymer (c-5)

(1) After a three-way cock was fitted to a three-necked flask having a volume of 2 L, and the inside thereof was replaced with nitrogen, 868 g of toluene, 43.4 g of 1,2-dimethoxyethane, and 60.0 g of a toluene solution containing 40.2 mmol of isobutyl-bis-(2,6-di-t-butyl-4-methylphenoxy) aluminum was added in the flask at room temperature, and 2.89 g of a mixed solution of cyclohexane and n-hexane containing 5.00 mmol of sec-butyl lithium was further added. Next, 35.9 g of methyl methacrylate was added thereto. A reaction solution exhibited yellow at the beginning and was turned into colorless after stirring at room temperature for 60 minutes. At this stage, the polymerization conversion rate of methyl methacrylate was 99.9% or more. Subsequently, after the inside temperature of a polymerization solution was cooled to −30° C., and 240 g of n-butyl acrylate was dripped for 2 hours, stirring was performed at −30° C. for 5 minutes. At this stage, the polymerization conversion rate of n-butyl acrylate was 99.9% or more. Furthermore, after 35.9 g of methyl methacrylate was added, and stirring was performed at room temperature for one night, 3.50 g of methanol was added, so that the polymerization reaction was stopped. At this stage, the polymerization conversion rate of methyl methacrylate was 99.9% or more. The reaction solution thus obtained was poured to 15 kg of methanol, and a white precipitate was separated. Next, the white precipitate was recovered by filtration, followed by drying, so that 308 g of a triblock copolymer [acrylic block copolymer (c-5)] was obtained.

(2) $^1$H-NMR measurement and GPC measurement were performed on the acrylic block copolymer (c-5) obtained in the above (1), and according to the results thereof, it was found that the acrylic block copolymer (c-5) was a triblock copolymer of poly(methyl methacrylate)-poly(n-butyl acrylate)-poly(methyl methacrylate), the weight average molecular weight (Mw) was 73,000, the number average molecular weight (Mn) was 65,000, and the molecular weight distribution (Mw/Mn) was 1.12. In addition, as for the content ratios of the individual polymer blocks in the acrylic block copolymer (c-5), the methyl methacrylate polymer block (polymer block A) was 23.0 percent by mass, and the n-butyl acrylate polymer block (block copolymer B) was 77.0 percent by mass.

(3) In addition, when the glass transition temperatures of the individual block copolymers of the acrylic block copolymer (c-5) obtained in the above (1) and the tacticity (rr) of the methyl methacrylate block (polymer block A) were obtained by the methods described above, the results were as shown in the following Table 1.

The data of the acrylic block copolymers (c-1), (c-2), (c-3), (c-4), and (c-5) obtained in Synthesis Examples 1 to 5 described above are shown in the following Table 1.

In addition, as for the commercially available acrylic block copolymer used in Comparative Examples 4, 5, and 7 ["Nanostrength" (registered trademark) M22 manufactured by Arkema; triblock copolymer of poly(methyl methacrylate)-poly(n-butyl acrylate)-poly(methyl methacrylate)] [triblock copolymer (M22)], the weight average molecular weight (Mw), the number average molecular weight (Mn), the molecular weight distribution (Mw/Mn), the content ratios of the individual polymer blocks, the glass transition temperatures thereof, and the tacticity (rr) of the methyl methacrylate block (polymer block A) were also obtained as in Synthesis Examples 1 to 5, and the results are shown in the following Table 1. In addition, the microphase separation structure of "Nonostrength" has been disclosed in Non-Patent Documents 4 and 5.

An adhesion surface of the aluminum plate in peeling was observed by visual inspection, and when the cured resin was fractured at the interface with the aluminum plate, the peeling mode was categorized as "interfacial", and when the cured resin was fractured at a position other than the interface with the aluminum plate, the peeling mode was categorized as "cohesive". When the cured resin was fractured both at the

TABLE 1

| | ACRYLIC BLOCK COPOLYMER | | | | | |
|---|---|---|---|---|---|---|
| | (c-1) | (c-2) | (c-3) | (c-4) | (c-5) | (M22) |
| WEIGHT AVERAGE MOLECULAR WEIGHT (Mw) | 161,000 | 63,000 | 132,000 | 137,000 | 73,000 | 132,000 |
| NUMBER AVERAGE MOLECULAR WEIGHT (Mn) | 126,000 | 50,000 | 101,000 | 112,000 | 65,000 | 70,000 |
| MOLECULAR WEIGHT DISTRIBUTION (Mw/Mn) | 1.28 | 1.26 | 1.31 | 1.22 | 1.12 | 1.89 |
| CONTENT OF POLYMER BLOCK A (PERCENT BY MASS) | 30.0 | 32.0 | 31.3 | 51.4 | 23.0 | 50.0 |
| CONTENT OF POLYMER BLOCK B (PERCENT BY MASS) | 70.0 | 68.0 | 68.7 | 48.6 | 77.0 | 50.0 |
| GLASS TRANSITION TEMPERATURE (° C.) | | | | | | |
| POLYMER BLOCK A | 115.0 | 101.8 | 114.7 | 110.8 | 100.3 | 70.5 |
| POLYMER BLOCK B | −46.1 | −44.6 | −46.0 | −53.2 | −46.3 | −35.5 |
| TACTICITY OF POLYMER BLOCK (rr) (%) | 73.0 | 70.5 | 72.7 | 70.2 | 67.3 | 44.7 |

(II) Manufacturing of Curable Resin Composition and Cured Resin, and Measurement of Properties Thereof In Examples 1 to 16 and Comparative Examples 1 to 7 described below, a curable resin composition mainly composed of an epoxy resin was manufactured, and a cured resin was manufactured by heat curing thereof.

In the following examples and comparative examples, measurement of the peel adhesive strength, fracture toughness value, and the elastic modulus of the cured resin obtained by heat curing and observation of the phase structure were performed by the following methods.

(II-1) Peel Adhesive Strength
(1) After an aluminum plate (JIS H4000 A1050P) having a length of 200 mm, a width of 25 mm, and a thickness of 0.5 mm was prepared, was pre-treated by sanding using sandpaper (grain size 100 (WTCC-D)), and was then degreased with acetone, a UV treatment [using "UVR-200G-SSII" manufactured by Senengineering Co., Ltd.] was performed for 10 minutes, so that a substrate was obtained.
(2) After the curable resin compositions manufactured in the following examples and comparative examples were each applied to the substrate of the above (1), and an adhesive layer was controlled to have a thickness (before curing) of approximately 100 μm using a spacer, another substrate was provided to sandwich the adhesive layer, and the curable resin composition was heat-cured on the aluminum plate using the same heat curing conditions as those used in the following examples and comparative examples to form a laminate composed of the aluminum plate/cured resin/aluminum plate. Subsequently, the laminate thus formed was slowly cooled to room temperature (25° C.) for 12 hours and was used as a test specimen for the peel adhesive strength measurement.
(3) By using the test specimen obtained in the above (2), the peel adhesive strength was measured at a temperature of 23° C. in the air at a displacement rate of 100 mm/min in accordance with JIS K 6854-3 using a screw type universal tester ["screw type universal tester 210B" manufactured by Intesco Co., Ltd.].

interface and at a place other than the interface, the peeling mode was categorized as "cohesive".

(II-2) Shear Adhesive Strength
(1) After a steel plate (JIS G3141 SPCC-SB) having a length of 125 mm, a width of 25 mm, and a thickness of 1.6 mm was prepared and was degreased with acetone, a UV treatment [using "UVR-200G-SSII" manufactured by Senengineering Co., Ltd.] was performed for 10 minutes, so that a substrate was obtained.
(2) After the curable resin compositions manufactured in the following examples and comparative examples were each applied to the substrate of the above (1), and an adhesive layer was controlled to have a thickness (before curing) of approximately 50 μm using a spacer, another substrate was provided to sandwich the adhesive layer, and the curable resin composition was heat-cured on the steel plate using the same heat curing conditions as those used in the following examples and comparative examples to form a laminate composed of the steel plate/cured resin/steel plate. Subsequently, the laminate thus formed was slowly cooled to room temperature (25° C.) for 12 hours to form a test specimen for the shear adhesive strength measurement. As a support plate, an aluminum plate (JIS H4000 A2017P) having a length of 40 mm, a width of 25 mm, and a thickness of 1.5 mm was prepared and was fixed with an adhesive.
(3) By using the test specimen obtained in the above (2), the shear adhesive strength was measured at a temperature of 23° C. in the air at a displacement rate of 10 mm/min in accordance with JIS K 6850 using a screw type universal tester ["screw type universal tester 210B" manufactured by Intesco Co., Ltd.].

(II-3) Fracture Toughness Value K1c
A test specimen having a length of 50 mm, a width of 12 mm, and a thickness of 6 mm was cut out from each of the cured resins having a thickness of 6 mm manufactured in the following examples and comparative examples, and by using this test specimen, a "Single edge notched bending (SENB)

test" in accordance with ASTM D 5045-91 was performed at a temperature of 23° C. in the air at a compressive displacement rate of 10 mm/min using a screw type universal tester ["screw type universal tester 210B" manufactured by Intesco Co., Ltd.], so that the fracture toughness value K1c was obtained.

In this case, a cutter blade having a thickness of 0.25 mm which was cooled with liquid nitrogen was placed at a groove formed by a saw in a central portion of the test specimen in the thickness direction to introduce a crack and was then struck by a hammer, so that a sharp crack was introduced. An initial crack length (a) on the order of 0.01 mm was measured at five points by a readout microscope having a magnification of 50 times and was averaged. As a result, the crack length (a) thus generated was in the range of 5.4 to 6.6 mm.

(II-4) Elastic Modulus

A test specimen having a length of 40 mm, a width of 10 mm, and a thickness of 2 mm was cut out from each of the cured resins having a thickness of 2 mm which were manufactured in the following examples and comparative examples, and by using this test specimen, the elastic modulus was measured in accordance with JIS K7171 using a screw type universal tester ["screw type universal tester 210B" manufactured by Intesco Co., Ltd.].

In this case, the test was performed in a three-point flexural mode with a span of 32 mm at a displacement rate of 3 mm/min.

(II-5) Observation of Phase Structure of Cured Resin (II-5a) Observation of Phase Structure by Scanning Probe Microscope The test specimens for fracture toughness value measurement obtained in the following examples and comparative examples were each freeze-fractured in liquid nitrogen, and the freeze-fracture surface was scanned by a scanning probe microscope ["multifunctional type SPM E-sweep" manufactured by SII Nano Technology Inc.] at a resonant frequency of 1.0 Hz using SI-DF20 as a DMF mode short probe, so that the phase structure was observed (magnification: 50,000 times).

(II-5b) Observation of Phase Structure by Scanning Electron Microscope

The test specimens for fracture toughness value measurement obtained in the following examples and comparative examples were each freeze-fractured in liquid nitrogen, and the freeze-fracture surface was photographed (magnification: 50,000 times) by a scanning electron microscope ["3D Real Surface View Microscope VE-9800" manufactured by Keyence Corp.], so that the phase structure was observed.

(II-5c) Observation of Phase Structure by Transmission Electron Microscope

From the test specimen for fracture toughness value measurement obtained in each of the following examples and comparative examples, by using an ultra microtome, a slice (a) having a thickness of 60 nm was sampled in a vertical direction at a position 2 mm apart from the end portion along a length direction, and/or from the same test specimen for fracture toughness value measurement, a slice (b) having a thickness of 60 nm was sampled at a position 5 mm apart from the end portion in a direction orthogonal to the length direction. After a cut surface of at least one of the slice (a) and the slice (b) was placed in a Petri dish together with an aqueous $RuO_4$ solution for vapor phase exposure to perform electron staining, by using a transmission electron microscope ["Transmission Microscope H-800NA" manufactured by Hitachi, Ltd.], the slice was photographed (magnification: 50,000 times and 250,000 times) at an acceleration voltage of 100 kv, and from the cross-sectional photograph of at least one of the slice (a) and the slice (b), the microphase separation structure was observed (judgment whether the microphase separation structure is a spherical, a particle, or a linear structure, measurement of the diameter of the microphase separation structural body, and the like).

(II-5d) Observation of Anisotropy by Planarization Microscope

After a test specimen was cut out from each of the cured resins obtained from the following examples and comparative examples and was adhered on a slide glass with an epoxy-based ordinary temperature curable resin ("Epo-Thin" manufactured by BUEHLER Ltd.), the test specimen was embedded using a cold embedding resin ("No. 105" manufactured by Marumoto Struers K.K.) and an M agent (curing agent, "UN No. 3103") and was polished to a thickness of approximately 50 to 70 μm. Subsequently, by using a polarization microscope ("ECLIPSE E600W POL" manufactured by Nikon Corp.), the optical transparency in a cross Nicol state was observed, so that it was confirmed whether the anisotropy is present or not (magnification: 50 times).

Example 1

(1) Manufacturing of Curable Resin Composition

After 100 g of bisphenol A diglycidyl ether ["JER828" manufactured by Japan Epoxy Resin Co., Ltd.] and 39.02 g of the acrylic block copolymer (c-1) manufactured in Synthesis Example 1 were placed in a container, the container was immersed in an oil bath set at a temperature of 200° C., and the content in the container was stirred for 30 minutes using a stirring device ("MAZELA NZ-1200" manufactured by TOKYO RIKAKIKAI CO., LTD., 400 rpm). Next, after the container was recovered from the oil bath, was cooled to room temperature, and was then heated to 100° C. by an oven, 0.5 g of triphenylphosphine [manufactured by Tokyo Chemical Industry Co., Ltd.] (curing accelerator) and 55.56 g of a phenol-formaldehyde novolac resin ["PR-HF-3" manufactured by Sumitomo Bakelite Co., Ltd.] were added in this order. Subsequently, by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) Manufacturing of Test Specimen (Cured Resin) for Measurement of Fracture Toughness Value and Measurement Thereof After being heated to 110° C. and vacuum-defoamed for 20 minutes, the curable resin composition obtained in the above (1) was poured from above into a mold in which a U-shaped Teflon (registered trademark) spacer (thickness: 6 mm) was fixed by being sandwiched with two aluminum-made plates (size having a length of 120 mm and a width of 100 mm) which were processed beforehand by a mold-releasing treatment by application of a releasing agent ["Daifree GA-6010" manufactured by Daikin Industries Ltd.], and a precure was performed at 120° C. for 2 hours. Subsequently, a postcure was performed at 150° C. for 2 hours, so that a plate-shaped cured resin (size having a length of 90 mm, a width of 85 mm, and a thickness of 6 mm) was formed. After this cured resin was cut into a strip shape having a length of 50 mm, a width of 12 mm, and a thickness of 6 mm as a test specimen, when the fracture toughness value thereof was measured by the method described above, the result shown in the following Table 2 was obtained.

(ii) Manufacturing of Test Specimen (Cured Resin) for Measurement of Elastic Modulus and Measurement Thereof After being heated to 110° C. and vacuum-defoamed for 20 minutes, the curable resin composition obtained in the above (1) was poured from above into a mold in which a U-shaped Teflon (registered trademark) spacer (thickness: 2 mm) was fixed by being sandwiched with two aluminum-made plates (size having a length of 120 mm and a width of 100 mm) which were processed beforehand by a mold-releasing treatment by application of a releasing agent ["Daifree GA-6010" manufactured by Daikin Industries Ltd.], and a precure was performed at 120° C. for 2 hours. Subsequently, a postcure was performed at 150° C. for 2 hours, so that a plate-shaped cured resin (size having a length of 90 mm, a width of 85 mm, and a thickness of 2 mm) was formed.

This cured resin was cut into a test specimen having a length of 40 mm, a width of 10 mm, and a thickness of 2 mm, and when the elastic modulus thereof was measured by the method described above, the result shown in the following Table 2 was obtained.

(iii) Manufacturing of Test Specimen (Laminate) for Measurement of Peel Adhesive Strength and Measurement Thereof After an aluminum plate (JIS H4000A1050P) having a length of 200 mm, a width of 25 mm, and a thickness of 0.5 mm was pre-treated by sanding using sandpaper [grain size 100 (WTCC-D)] and was then degreased with acetone, a UV treatment [using "UVR-200G-SSII" manufactured by Senengineering Co., Ltd.] was performed for 10 minutes, so that an aluminum plate (hereinafter referred to as "aluminum-plate substrate") was prepared.

After being heated to 110° C. and vacuum-defoamed for 20 minutes, the curable resin composition obtained in the above (1) was applied to the aluminum-plate substrate prepared as described above, and an adhesive layer was controlled to have a thickness (before curing) of approximately 100 μm using a spacer. Subsequently, after a precure was performed at 120° C. for 2 hours, a postcure was performed at 150° C. for 2 hours, and cooling was then performed to room temperature (25° C.), so that a laminate (test specimen) for peel adhesive strength measurement was formed.

By using this test specimen, when the peel adhesive strength was measured by the method described above, the result shown in the following Table 2 was obtained.

Figure 2:
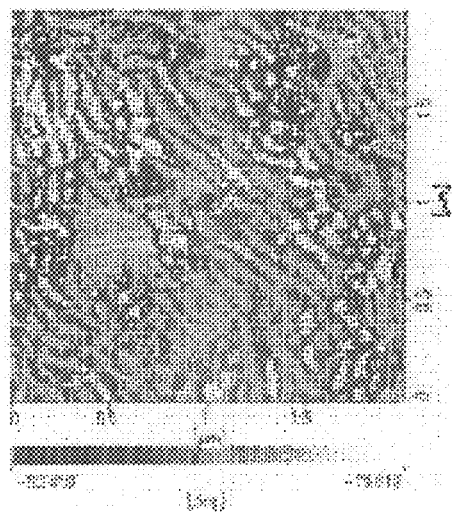
FIG. 2 is a photograph of a freeze-fracture surface of a cured resin obtained by curing a curable resin composition according to Example 1, the photograph being taken using a scanning probe microscope.

(iv) Observation of Phase Structure of Cured Resin (iv-1) By using the test specimen for fracture toughness value measurement obtained in the above (i), when the phase structure of a freeze-fracture surface was observed by the method of the above (II-5a) using a scanning probe microscope, as shown in FIG. 2, a microphase separation structure was observed in which the poly(n-butyl acrylate) block (polymer block B) in the acrylic block copolymer (c-1) formed a micro linear structure and was dispersed in a cured epoxy resin matrix.

[Since a poly(n-butyl acrylate) block portion which was a soft component of the acrylic block copolymer (c-1) was photographed as a bright color portion of a phase image, it was observed that the dispersion state of the poly(n-butyl acrylate) block portion in the cured resin formed a micro linear structure (a linear structural portion having bright color in the photograph of FIG. 2).]

Figure 3:
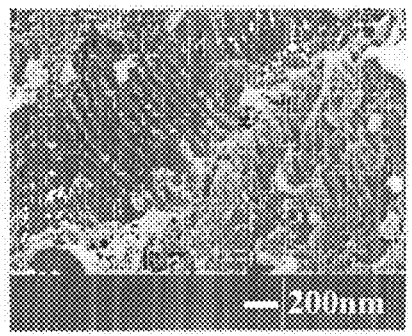
FIG. 3 is a photograph of a freeze-fracture surface of the cured resin obtained by curing the curable resin composition according to Example 1, the photograph being taken using a scanning electron microscope.

(iv-2) By using the test specimen for fracture toughness value measurement obtained in the above (i), when the phase structure of a freeze-fracture surface was photographed by the method of the above (II-5b) using a scanning electron microscope (magnification: 50,000 times), as shown in FIG. 3, a microphase separation structure was observed in which a linear structure was formed and was dispersed, and this structure well coincided with the image observed in the above (iv-1); hence, the microphase separation structure was confirmed in which the poly(n-butyl acrylate) block (polymer block B) in the acrylic block copolymer (c-1) formed a micro linear structure and was dispersed in the cured epoxy resin matrix.

(iv-3) By using the test specimen for fracture toughness value measurement obtained in the above (i), when the cut surface of the slice (a) was photographed (magnification: 50,000 times and 250,000 times) by the method of the above (II-5c) using a transmission electron microscope, a poly(n-butyl acrylate) block portion was observed as a dark color portion, and a microphase separation structure was observed in which the poly(n-butyl acrylate) block (polymer block B) in the acrylic block copolymer (c-1) formed a micro linear structure and was dispersed in the cured epoxy resin matrix.

After 10 dark color portions (linear structural bodies) in the photograph (magnification: 250,000 times) thus obtained were arbitrarily selected, when the diameters of the portions were measured and averaged, the result shown in the following Table 2 was obtained.

[Since an unreacted phenol-formaldehyde novolac resin, which was the epoxy resin curing agent, remained in the poly(n-butyl acrylate) block portion which was a soft component of the acrylic block copolymer (c-1), and a phenolic hydroxyl group of the phenol-formaldehyde novolac resin was stained with $RuO_4$, the poly(n-butyl acrylate) block portion in the cured resin was observed as a dark color portion.]

Example 2

(1) Manufacturing of Curable Resin Composition

After 100 g of bisphenol A diglycidyl ether (compound identical to that used in Example 1) and 17.34 g of the acrylic block copolymer (c-1) manufactured in Synthesis Example 1 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was then heated to 100° C. by an oven, 0.5 g of triphenylphosphine (compound identical to that used in Example 1) and 55.56 g of a phenol-formaldehyde novolac resin (resin identical to that used in Example 1) were added in this order. Subsequently, by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 2 were obtained.

(ii) In addition, by using the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), a cross-sectional photograph was obtained which showed a microphase separation structure in which a poly(n-butyl acrylate) block portion formed a spherical structure having a uniform size as a dark color portion and was dispersed in the matrix.

After 10 dark color portions (spherical structural bodies) in the photograph (magnification: 250,000 times) thus obtained were arbitrarily selected, when the diameters (maximum diameters) of the portions were measured and averaged, as shown in the following Table 2, the average diameter of the spherical structural body was 27 nm.

Example 3

(1) Manufacturing of Curable Resin Composition

After 100 g of bisphenol A diglycidyl ether (compound identical to that used in Example 1) and 39.02 g of the acrylic block copolymer (c-1) manufactured in Synthesis Example 1 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was then heated to 100° C. by an oven, 0.5 g of triphenylphosphine (compound identical to that used in Example 1) and 55.56 g of a phenol-formaldehyde novolac resin (resin identical to that used in Example 1) were added in this order. Subsequently, by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) Manufacturing of Test Specimen for Measurement of Peel Adhesive Strength and Measurement Thereof After being heated to 100° C. and vacuum-defoamed for 20 minutes, the curable resin composition obtained in the above (1) was applied to the aluminum-plate substrate identical to that used in the (2) (iii) of Example 1, and an adhesive layer was controlled to have a thickness (before curing) of approximately 100 μm using a spacer. Subsequently, after a precure was performed at 100° C. for 3 hours, a postcure was performed at 150° C. for 2 hours, and cooling was then performed to room temperature (25° C.), so that a laminate (test specimen) for peel adhesive strength measurement was formed. By using this test specimen, when the peel adhesive strength was measured by the method described above, the result shown in the following Table 2 was obtained.

(ii) Observation of Phase Structure of Cured Resin

After being heated to 100° C. and vacuum-defoamed for 20 minutes, the curable resin composition obtained in the above (1) was poured from above into a mold in which a U-shaped Teflon (registered trademark) spacer (thickness: 6 mm) was fixed by being sandwiched with two aluminum-made plates (size having a length of 120 mm and a width of 100 mm) which were processed by the same mold-releasing treatment as that used in the (2) (i) of Example 1, and a precure was performed at 100° C. for 3 hours. Subsequently, a postcure was performed at 150° C. for 2 hours, so that a plate-shaped cured resin (size having a length of 90 mm, a width of 85 mm, and a thickness of 6 mm) was formed (identical to the test specimen for fracture toughness value measurement formed in Example 1).

By using this cured resin, when the phase structure of a freeze-fracture surface was photographed by the method of the above (II-5b) using a scanning electron microscope (magnification: 50,000 times), a microphase separation structure was observed in which the poly(n-butyl acrylate) block (polymer block B) in the acrylic block copolymer (c-1) formed a micro linear structure and was dispersed in the cured epoxy resin matrix. Although the curing conditions were different from those of Example 1, a microphase separation structure similar to that thereof was obtained.

Example 4

(1) Manufacturing of Curable Resin Composition

After 100 g of bisphenol A diglycidyl ether (compound identical to that used in Example 1) and 17.34 g of the acrylic block copolymer (c-2) manufactured in Synthesis Example 2 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was then heated to 100° C. by an oven, 0.5 g of triphenylphosphine (compound identical to that used in Example 1) and 55.56 g of a phenol-formaldehyde novolac resin (resin identical to that used in Example 1) were added in this order. Subsequently, by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 2 were obtained.

(ii) In addition, by using the test specimen for fracture toughness value measurement manufactured in the above (i), when the cut surface of the slice (a) was photographed by the method of the above (II-5c) using a transmission electron microscope (magnification: 50,000 times and 250,000 times), a microphase separation structure was observed in which the poly(n-butyl acrylate) block (polymer block B) in the acrylic block copolymer (c-2) formed a micro linear structure and was dispersed in the cured epoxy resin matrix.

After 10 dark color linear structural bodies in the photograph (magnification: 250,000 times) thus obtained were arbitrarily selected, when the diameters of the bodies were measured and averaged, the result shown in the following Table 2 was obtained.

Example 5

(1) Manufacturing of Curable Resin Composition

After 100 g of bisphenol A diglycidyl ether (compound identical to that used in Example 1) and 39.02 g of the acrylic block copolymer (c-2) manufactured in Synthesis Example 2 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was then heated to 100° C. by an oven, 0.5 g of triphenylphosphine (compound identical to that used in Example 1) and 55.56 g of a phenol-formaldehyde novolac resin (resin identical to that used in Example 1) were added in this order. Subsequently, by using a stirring bar made of stainless steel, stirring and mixing were sufficiently performed by hand until a uniform state was obtained (stirring was performed at a temperature of 100° C. for approximately 10 minutes), so that a curable resin composition was prepared.

Figure 4:
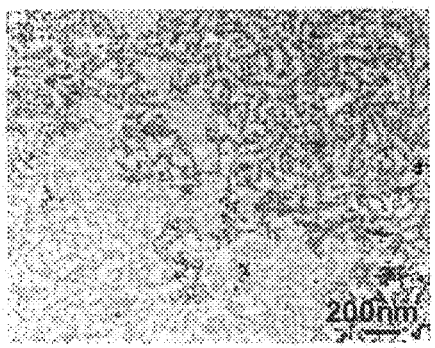
FIG. 4 is a photograph of a cut surface of a cured resin obtained by curing a curable resin composition according to Example 5, the photograph being taken using a transmission electron microscope.
Figure 5:
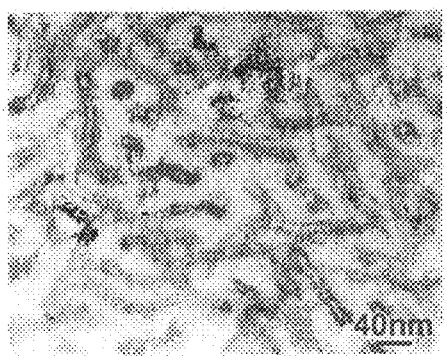
FIG. 5 is a photograph of a cut surface of the cured resin obtained by curing the curable resin composition according to Example 5, the photograph being taken using a transmission electron microscope.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 2 were obtained.
(ii) In addition, by using the test specimen for fracture toughness value measurement obtained in the above (i), when the cut surface of the slice (a) was photographed by the method of the above (II-5c) using a transmission electron microscope (magnification: 50,000 times and 250,000 times), as shown in FIGS. 4 and 5, a microphase separation structure was observed in which the poly(n-butyl acrylate) block (polymer block B) in the acrylic block copolymer (c-2) formed a micro linear structure and was dispersed in the cured epoxy resin matrix.
[Since an unreacted phenol-formaldehyde novolac resin, which was an epoxy resin curing agent, remained in a poly(n-butyl acrylate) block portion which was a soft component of the acrylic block copolymer (c-2), and a phenolic hydroxyl group of the phenol-formaldehyde novolac resin was stained with $RuO_4$, it was observed that the dispersion state of the poly(n-butyl acrylate) block portion in the cured resin formed a micro linear structure (dark color line structural portions in the photographs of FIGS. 4 and 5).]

After 10 dark color portions (linear structural bodies) in the photograph (magnification: 250,000 times) thus obtained were arbitrarily selected, when the diameters of the portions were measured and averaged, the result shown in the following Table 2 was obtained.

Comparative Example 1

(1) Manufacturing of Curable Resin Composition

After 100 g of bisphenol A diglycidyl ether (compound identical to that used in Example 1) was placed in a container and was heated to approximately 100° C. by an oven, 0.5 g of triphenylphosphine (compound identical to that used in Example 1) and 55.56 g of a phenol-formaldehyde novolac resin (resin identical to that used in Example 1) were added in this order, and by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 3 were obtained.
(ii) In addition, by using the test specimen for fracture toughness value measurement manufactured in the above (i), when a freeze-fracture surface was photographed by the method of the above (II-5b) using a scanning electron microscope (magnification: 50,000 times) and was observed, the individual components were uniformly mixed together, and no phase separation structure was observed.

Comparative Example 2

(1) Manufacturing of Curable Resin Composition

After 100 g of bisphenol A diglycidyl ether (compound identical to that used in Example 1) was placed in a container and was heated to approximately 100° C. by an oven, 3.0 g of dichlorophenyl dimethylurea [manufactured by Hodogaya Chemical Co., Ltd.] (curing accelerator), and 5.0 g of dicyandiamide ["Epicure DICY7" manufactured by Japan Epoxy Resin Co., Ltd.] (epoxy resin curing agent) were added in this order, and by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of cured resin and measurement of properties thereof (i) Manufacturing of Test Specimen (Cured Resin) for Fracture Toughness Measurement After being heated to 100° C. and vacuum-defoamed for 20 minutes, the curable resin composition obtained in the above (1) was poured from above into a mold in which a U-shaped Teflon (registered trademark) spacer (thickness: 6 mm) was fixed by being sandwiched with two aluminum-made plates (size having a length of 120 mm and a width of 100 mm) which were processed by the same mold-releasing treatment as that used in the (2) (i) of Example 1, and a precure was performed at 110° C. for 2 hours. Subsequently, a postcure was performed at 150° C. for 1 hour, so that a plate-shaped cured resin (size having a length of 90 mm, a width of 85 mm, and a thickness of 6 mm) was formed. After this cured resin was cut into a strip shape having a length of 50 mm, a width of 12 mm, and a thickness of 6 mm as a test specimen, when the fracture toughness value thereof was measured by the method described above, the result shown in the following Table 3 was obtained.

(ii) Manufacturing of Test Specimen (Laminate) for Measurement of Peel Adhesive Strength and Measurement Thereof After being heated to 100° C. and vacuum-defoamed for 20 minutes, the curable resin composition obtained in the above (1) was applied to the aluminum-plate substrate identical to that used in the (2) (iii) of Example 1, and an adhesive layer was controlled to have a thickness (before curing) of approximately 100 μm using a spacer. Subsequently, after a precure was performed at 110° C. for 2 hours, a postcure was performed at 150° C. for 1 hour, and cooling was then performed to room temperature (25° C.), so that a laminate (test specimen) for peel adhesive strength measurement was formed. By using this test specimen, when the peel adhesive strength was measured by the method described above, the result shown in the following Table 3 was obtained.

(iii) Observation of Phase Structure of Cured Resin

By using the test specimen for fracture toughness value measurement manufactured in the above (i), when a freeze-fracture surface was photographed by the method of the above (II-5b) using a scanning electron microscope (magnification: 50,000 times) and was observed, the individual components were uniformly mixed together, and no phase separation structure was observed.

Comparative Example 3

(1) Manufacturing of Curable Resin Composition

After 100 g of bisphenol A diglycidyl ether (compound identical to that used in Example 1) was placed in a container and was heated to approximately 100° C. by an oven, 32.85 g of diaminodiphenylsulfone ["Sumicure S" manufactured by Sumitomo Chemical Co., Ltd., active hydrogen equivalent: 62.08 g/eq] (epoxy resin curing agent) was added, and by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) Manufacturing of Test Specimen (Cured Resin) for Fracture Toughness Value Measurement After being heated to 120° C. and vacuum-defoamed for 30 minutes, the curable resin composition obtained in the above (1) was poured from above into a mold in which a U-shaped Teflon (registered trademark) spacer (thickness: 6 mm) was fixed by being sandwiched with two aluminum-made plates (size having a length of 120 mm and a width of 100 mm) which were processed by the same mold-releasing treatment as that used in the (2) (i) of Example 1, and a precure was performed at 150° C. for 3 hours. Subsequently, a postcure was performed at 200° C. for 2 hour, so that a plate-shaped cured resin (size having a length of 90 mm, a width of 85 mm, and a thickness of 6 mm) was formed. After this cured resin was cut into a strip shape having a length of 50 mm, a width of 12 mm, and a thickness of 6 mm as a test specimen, when the fracture toughness value thereof was measured by the method described above, the result shown in the following Table 3 was obtained.

(ii) Manufacturing of Test Specimen (Laminate) for Peel Adhesive Strength Measurement After being heated to 120° C. and vacuum-defoamed for 30 minutes, the curable resin composition obtained in the above (1) was applied to the aluminum-plate substrate identical to that used in the (2) (iii) of Example 1, and an adhesive layer was controlled to have a thickness (before curing) of approximately 100 μm using a spacer. Subsequently, after a precure was performed at 150° C. for 3 hours, a postcure was performed at 200° C. for 2 hours, and cooling was then performed to room temperature (25° C.), so that a laminate (test specimen) for peel adhesive strength measurement was formed. By using this test specimen, when the peel adhesive strength was measured by the method described above, the result shown in the following Table 3 was obtained.

(iii) Observation of Phase Structure of Cured Resin

By using the test specimen for fracture toughness value measurement manufactured in the above (1), when a freeze-fracture surface was photographed by the method of the above (II-5b) using a scanning electron microscope (magnification: 50,000 times) and was observed, the individual components were uniformly mixed together, and no phase separation structure was observed.

Comparative Example 4

(1) Manufacturing of Curable Resin Composition

After 100 g of bisphenol A diglycidyl ether (compound identical to that used in Example 1) and 17.34 g of a commercially available acrylic block copolymer (M22) ["Nanostrength" (registered trademark) M22 manufactured by Arkema; a triblock copolymer of poly(methyl methacrylate)-poly(butyl acrylate)-poly(methyl methacrylate)] were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was then heated to 100° C. by an oven, 0.5 g of triphenylphosphine (compound identical to that used in Example 1) and 55.56 g of a phenol-formaldehyde novolac resin (resin identical to that used in Example 1) were added in this order. Subsequently, by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) By using the curable resin composition obtained in the above (1), the same processes and operations as those of (2)

(i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 3 were obtained.

(ii) By using the test specimen for fracture toughness value measurement obtained in the above (1), when the cut surfaces of the slices (a) and (b) were photographed by the method of the above (II-5c) using a transmission electron microscope (magnification: 50,000 times and 250,000 times), a microphase separation structure was observed in which the poly(n-butyl acrylate) block (polymer block B) in the acrylic block copolymer (M22) formed a micro spherical structure and was dispersed in the cured epoxy resin matrix; however, the sizes of spherical structural bodies were not uniform and were different from each other.

TABLE 2

|  | EXAMPLE 1 | EXAMPLE 2 | EXAMPLE 3 | EXAMPLE 4 | EXAMPLE 5 |
|---|---|---|---|---|---|
| [EPOXY RESIN COMPOSITION (HAND STIRRING AND MIXING) (PARTS BY MASS)] EPOXY RESIN |  |  |  |  |  |
| BISPHENOL A DIGLYCIDYL ETHER EPOXY RESIN CURING AGENT | 100 | 100 | 100 | 100 | 100 |
| PHENOL NOVOLAC RESIN DICYANDIAMIDE DIAMINODIPHENYLSULFONE CURING ACCELERATOR | 55.56 | 55.56 | 55.56 | 55.56 | 55.56 |
| TRIPHENYLPHOSPHINE DICHLOROPHENYL DIMETHYLUREA ACRYLIC BLOCK COPOLYMER | 0.5 | 0.5 | 0.5 | 0.5 | 0.5 |
| ACRYLIC BLOCK COPOLYMER (c-1) (Mw = 161,000, Mw/Mn = 1.28) | 39.02 | 17.34 | 39.02 |  |  |
| ACRYLIC BLOCK COPOLYMER (c-2) (Mw = 63,000, Mw/Mn = 1.26) |  |  |  | 17.34 | 39.02 |
| ACRYLIC BLOCK COPOLYMER (M22) (Mw = 132,000, Mw/Mn = 1.89) [CURING CONDITIONS] PRECURE |  |  |  |  |  |
| TEMPERATURE (° C.) | 120 | 120 | 100 | 120 | 120 |
| TIME (HOURS) POSTCURE | 2 | 2 | 3 | 2 | 2 |
| TEMPERATURE (° C.) | 150 | 150 | 150 | 150 | 150 |
| TIME (HOURS) [PROPERTIES AND PHASE STRUCTURE OF CURED RESIN] | 2 | 2 | 2 | 2 | 2 |
| PEEL ADHESIVE STRENGTH (N/25 mm) | 62.86 | 13.88 | 57.87 | 31.41 | 47.39 |
| FRACTURE MODE IN PEELING | INTERFACIAL | INTERFACIAL | INTERFACIAL | INTERFACIAL | INTERFACIAL |
| FRACTURE TOUGHNESS VALUE (MPa·m$^{1/2}$) | 2.54 | 1.62 | — | 2.95 | 2.48 |
| ELASTIC MODULUS (GPa) | 2.07 | 2.63 | — | 2.64 | 2.09 |
| PHASE STRUCTURE | MICROPHASE SEPARATION LINEAR STRUCTURE[1] | MICROPHASE SEPARATION SPHERICAL STRUCTURE[2] | MICROPHASE SEPARATION LINEAR STRUCTURE[1] | MICROPHASE SEPARATION LINEAR STRUCTURE[1] | MICROPHASE SEPARATION LINEAR STRUCTURE[1] |
| DIAMETER OF LINEAR STRUCTURAL BODY OR SPHERICAL STRUCTURAL BODY TEM METHOD[3] (nm) | 28 | 27 | — | 24 | 25 |

[1] A microphase separation structure in which the polymer block B in the acrylic block copolymer forms a micro linear structure and is dispersed in a matrix of a cured epoxy resin.
[2] A microphase separation structure in which the polymer block B in the acrylic block copolymer forms a micro spherical structure and is dispersed in a matrix of a cured epoxy resin.
[3] Measurement by a transmission electron microscope.

TABLE 3

|  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| [EPOXY RESIN COMPOSITION (HAND STIRRING AND MIXING) (PARTS BY MASS)] EPOXY RESIN BISPHENOL A DIGLYCIDYL ETHER | 100 | 100 | 100 | 100 |

TABLE 3-continued

|  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|
| EPOXY RESIN CURING AGENT | | | | |
| PHENOL NOVOLAC RESIN | 55.56 | | | 55.56 |
| DICYANDIAMIDE | | 5.0 | | |
| DIAMINODIPHENYLSULFONE | | | 32.85 | |
| CURING ACCELERATOR | | | | |
| TRIPHENYLPHOSPHINE | 0.5 | | | 0.5 |
| DICHLOROPHENYL DIMETHYLUREA | | 3.0 | | |
| ACRYLIC BLOCK COPOLYMER | | | | |
| ACRYLIC BLOCK COPOLYMER (c-1) (Mw = 161,000, Mw/Mn = 1.28) | | | | |
| ACRYLIC BLOCK COPOLYMER (c-2) (Mw = 63,000, Mw/Mn = 1.26) | | | | |
| ACRYLIC BLOCK COPOLYMER (M22) (Mw = 132 000, Mw/Mn = 1.89) | | | | 17.34 |
| [CURING CONDITIONS] | | | | |
| PRECURE TEMPERATURE (° C.) | 120 | 110 | 150 | 120 |
| TIME (HOURS) | 2 | 2 | 3 | 2 |
| POSTCURE TEMPERATURE (° C.)) | 150 | 150 | 200 | 150 |
| TIME (HOURS) | 2 | 1 | 2 | 2 |
| [PROPERTIES AND PHASE STRUCTURE OF CURED RESIN] | | | | |
| PEEL ADHESIVE STRENGTH (N/25 mm) | 5.68 | 4.86 | 6.91 | 5.29 |
| FRACTURE MODE IN PEELING | COHESIVE | COHESIVE | COHESIVE | INTERFACIAL |
| FRACTURE TOUGHNESS VALUE (MPa · m$^{1/2}$) | 0.73 | 0.64 | 0.64 | 1.39 |
| ELASTIC MODULUS (GPa) | 3.14 | — | — | 2.72 |
| PHASE STRUCTURE | NO MICROPHASE SEPARATION | NO MICROPHASE SEPARATION | NO MICROPHASE SEPARATION | MICROPHASE SEPARATION SPHERICAL STRUCTURE [1] |

[1] A microphase separation structure in which the polymer block B in the acrylic block copolymer forms a micro spherical structure and is dispersed in a matrix of a cured epoxy resin.

As shown in Tables 2 and 3, since the curable resin compositions of Examples 1 to 5 each contain, together with the epoxy resin and the epoxy resin curing agent, the acrylic block copolymer (c-1) or (c-2) having a molecular weight distribution (Mw/Mn) of 1.5 or less in an amount in the range specified by the present invention, compared to the curable resin compositions of Comparative Examples 1 to 3 (curable epoxy resin compositions each contain no acrylic block copolymer) and to the curable resin composition of Comparative Example 4 [curable resin composition contains the acrylic block copolymer (M22) having a molecular weight distribution (Mw/Mn) of more than 1.5], the cured resins of the curable resin compositions of Examples 1 to 5 each have a significantly improved peel adhesive strength.

Furthermore, compared to the cured resins obtained by curing the curable resin compositions of Comparative Examples 1 to 4, the cured resins obtained by curing the curable resin compositions of Examples 1, 2, 4, and 5 each have a high fracture toughness value, is hardly fractured, and is excellent in durability (in Example 3, measurement of the fracture toughness and elastic modulus was not performed).

In particular, compared to the cured resin obtained by curing the curable resin composition of Comparative Example 4 containing the acrylic block copolymer (M22), the cured resins obtained from the curable resin compositions of Examples 1, 4, and 5 each have a significantly high fracture toughness value, and this excellent toughness thereof is by no means inferior to that of an engineering plastic such as a poly(butylene terephthalate).

As for the phase structure of the cured resin, the cured resins formed from the curable resin compositions of Examples 1, 3, 4, and 5 each have a microphase separation structure in which the polymer block B (poly(n-butyl acrylate) block) of the acrylic block copolymer (c-1) or (c-2) forms a micro linear structure having a diameter of 10 to 100 nm and is dispersed in the cured epoxy resin matrix, and it is believed that this microphase separation structure produces the high peel adhesive strength and fracture toughness value described above.

Example 6

(1) Manufacturing of Curable Resin Composition

After 100 g of bisphenol A diglycidyl ether (compound identical to that used in Example 1) and 17.34 g of the acrylic block copolymer (c-1) manufactured in Synthesis Example 1 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was then heated to 100° C. by an oven, 0.5 g of triphenylphosphine (compound identical to that used in Example 1) and 55.56 g of a phenol-formaldehyde novolac resin (resin identical to that used in Example 1) were added in this order. Subsequently, by using a stirring apparatus ("Awatori Rentaro ARV-310" manufactured by Thinky Corp.), while vacuum defoamation was performed (vacuum condition: 0.5 kPa, stirring condition: 2,000 rpm), mechanical stirring was performed for 10 minutes, so that a curable resin composition was prepared.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured by the methods described above, the results shown in the following Table 4 were obtained.

(ii) In addition, after the slices (a) and (b) were sampled by the method described above from the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), a microphase separation structure was observed in which a poly(n-butyl acrylate) block portion formed a micro spherical structure having a uniform size and was dispersed in the matrix as a dark color portion. After 10 dark color portions (micro spherical structural bodies) in the photograph (magnification: 250,000 times) thus obtained were arbitrarily selected, when the diameters (maximum diameters) of the portions were measured and averaged, as shown in the following Table 4, the average diameter of the spherical structural body was 44 nm.

Example 7

(1) Manufacturing of Curable Resin Composition

Except for using 17.34 g of the acrylic block copolymer (c-3) manufactured in Synthesis Example 3 as the acrylic block copolymer (c) instead of the acrylic block copolymer (c-1), the same process and operation as those of the (1) of Example 6 were performed, so that a curable resin composition mixed by mechanical mixing was prepared.

(2) Manufacturing of Cured Resin and Measurement of Properties Thereof (i) By using the curable resin composition obtained in the above (1), the same processes and operations as those of (2)(i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 4 were obtained.

(ii) In addition, after the slices (a) and (b) were sampled by the method described above from the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), a microphase separation structure was observed in which a poly(n-butyl acrylate) block portion formed a micro spherical structure having a uniform size and was dispersed in the matrix as a dark color portion. After 10 dark color portions (micro spherical structural bodies) in the photograph (magnification: 250,000 times) thus obtained were arbitrarily selected, when the diameters (maximum diameters) of the portions were measured and averaged, as shown in the following Table 4, the average diameter of the spherical structural body was 44 nm.

Reference Example 8

(1) Manufacturing of Curable Resin Composition

Except for using 17.34 g of the acrylic block copolymer (c-4) manufactured in Synthesis Example 4 as the acrylic block copolymer (c) instead of the acrylic block copolymer (c-1), the same process and operation as those of the (1) of Example 6 were performed, so that a curable resin composition mixed by mechanical mixing was prepared.

(2) Manufacturing of Cured Resin and Measurement of Properties Thereof (i) By using the curable resin composition obtained in the above (1), the same processes and operations as those of (2)(i), (ii), and (iii) of Example 1 were performed respectively to form a test specimen (a length of 50 mm, a width of 12 mm, and a thickness of 6 mm) for fracture toughness value measurement and a laminate (test specimen) for peel adhesive strength measurement, and when the fracture toughness value and the peel adhesive strength were measured respectively by the methods described above, the results shown in the following Table 4 were obtained.

(ii) In addition, by using the test specimen for fracture toughness value measurement manufactured in the above (1), the phase structure of a freeze-fracture surface was photographed (magnification: 50,000 times) by the method in the above (II-5b) using a scanning electron microscope, and the presence of the microphase separation structure was confirmed.

Example 9

(1) Manufacturing of Curable Resin Composition

Except for using 17.34 g of the acrylic block copolymer (c-5) manufactured in Synthesis Example 5 as the acrylic block copolymer (c) instead of the acrylic block copolymer (c-1), the same process and operation as those of the (1) of Example 6 were performed, so that a curable resin composition mixed by mechanical mixing was prepared.

(2) Manufacturing of Cured Resin and Measurement of Properties Thereof (i) By using the curable resin composition obtained in the above (1), the same processes and operations as those of (2)(i), and (iii) of Example 1 were performed respectively to form a test specimen (a length of 50 mm, a width of 12 mm, and a thickness of 6 mm) for fracture toughness value measurement and a laminate (test specimen) for peel adhesive strength measurement, and when the fracture toughness value and the peel adhesive strength were measured respectively by the methods described above, the results shown in the following Table 4 were obtained.

(ii) In addition, by using the test specimen for fracture toughness value measurement manufactured in the above (1), the phase structure of a freeze-fracture surface was photographed (magnification: 50,000 times) by the method of the above (II-5b) using a scanning electron microscope (magnification: 50,000 times), and the presence of the microphase separation structure was confirmed.

Comparative Example 5

(1) Manufacturing of Curable Resin Composition

Except for using 17.34 g of the commercially available acrylic block copolymer (M22) as the acrylic block copolymer instead of the acrylic block copolymer (c-1), the same process and operation as those of the (1) of Example 6 were performed, so that a curable resin composition mixed by mechanical mixing was prepared.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 4 were obtained.

(ii) In addition, after the slices (a) and (b) were sampled by the method described above from the test specimen for fracture toughness value measurement manufactured in the above (1), when the cut surfaces of the slices (a) and (b) were photographed by the method of the above (II-5c) using a transmission electron microscope (magnification: 50,000 times and 250,000 times), a microphase separation structure was observed in which a poly(n-butyl acrylate) block portion formed a micro spherical structure and was dispersed as a dark color portion in the matrix; however, the sizes of micro spherical structural bodies were not uniform and were different from each other. After 10 dark color portions (micro spherical structural bodies) in the photograph (magnification: 250,000 times) thus obtained were arbitrarily selected, when the diameters (maximum diameters) of the portions were measured and averaged, as shown in the following Table 4, the average diameter of the spherical structural body was 31 nm.

Comparative Example 6

(1) Manufacturing of Curable Resin Composition

Except for using no acrylic block copolymer, a curable resin composition mixed by mechanical mixing was prepared in a manner similar to that in the (1) of Example 6.

(2) Manufacturing of Cured Resin and Measurement of Properties Thereof (i) By using the curable resin composition obtained in the above (1), the same processes and operations as those of (2) (i) and (ii) of Example 1 were performed respectively to form a test specimen (a length of 50 mm, a width of 12 mm, and a thickness of 6 mm) for fracture toughness value measurement and a test specimen (a length of 40 mm, a width of 10 mm, and a thickness of 2 mm) for elastic modulus measurement, and when the fracture toughness value and the elastic modulus were measured by the methods described above, the results shown in the following Table 4 were obtained.

(ii) Manufacturing of Test Specimen (Laminate) for Measurement of Peel Adhesive Strength and Measurement Thereof A steel plate (JIS G3141 SPCC-SB) having a length of 125 mm, a width of 25 mm, and a thickness of 1.6 mm was degreased with acetone and was then processed by a UV treatment (using "UVR-200G-SSII" manufactured by Senengineering Co., Ltd.) for 10 minutes, so that a steel plate (hereinafter referred to as "steel-plate substrate") was prepared.

After being heated to 110° C. and vacuum-defoamed for 20 minutes, the curable resin composition obtained in the above (1) was applied to the steel-plate substrate prepared as described above, and an adhesive layer was controlled to have a thickness (before curing) of approximately 50 μm using a spacer. Subsequently, after a precure was performed at 120° C. for 2 hours, a postcure was performed at 150° C. for 2 hours, and cooling was then performed to room temperature (25° C.), so that a laminate (test specimen) for peel adhesive strength measurement was formed.

By using this test specimen, when the peel adhesive strength was measured by the method described above, the result shown in the following Table 5 was obtained.

(iii) In addition, after the slices (a) and (b) were sampled by the method described above from the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), the individual components were uniformly mixed together, and no microphase separation structure was observed.

(The results of Comparative Example 6 are shown in both Tables 4 and 5).

TABLE 4

| | EXAMPLE 6 | EXAMPLE 7 | Reference EXAMPLE 8 | EXAMPLE 9 | COMPARATIVE EXAMPLE 5 | COMPARATIVE EXAMPLE 6 |
|---|---|---|---|---|---|---|
| [EPOXY RESIN COMPOSITION (MECHANICAL STIRRING AND MIXING) (PARTS BY MASS)] EPOXY RESIN BISPHENOL A DIGLYCIDYL ETHER | 100 | 100 | 100 | 100 | 100 | 100 |
| EPOXY RESIN CURING AGENT PHENOL NOVOLAC RESIN DICYANDIAMIDE DIAMINODIPHENYLSULFONE | 55.56 | 55.56 | 55.56 | 55.56 | 55.56 | 55.56 |

TABLE 4-continued

| | EXAMPLE 6 | EXAMPLE 7 | Reference EXAMPLE 8 | EXAMPLE 9 | COMPARATIVE EXAMPLE 5 | COMPARATIVE EXAMPLE 6 |
|---|---|---|---|---|---|---|
| CURING ACCELERATOR TRIPHENYLPHOSPHINE | 0.5 | 0.5 | 0.5 | 0.5 | 0.5 | 0.5 |
| DICHLOROPHENYL DIMETHYLUREA | | | | | | |
| ACRYLIC BLOCK COPOLYMER | 17.34 | | | | | |
| ACRYLIC BLOCK COPOLYMER (c-1) (Mw = 161,000, Mw/Mn = 1.28) | | | | | | |
| ACRYLIC BLOCK COPOLYMER (c-3) (Mw = 132,000, Mw/Mn = 1.31) | | 17.34 | | | | |
| ACRYLIC BLOCK COPOLYMER (c-4) (Mw = 137,000, Mw/Mn = 1.22) | | | 17.34 | | | |
| ACRYLIC BLOCK COPOLYMER (c-5) (Mw = 73,000, Mw/Mn = 1.12) | | | | 17.34 | | |
| ACRYLIC BLOCK COPOLYMER (M22) (Mw = 132,000, Mw/Mn = 1.89) | | | | | 17.34 | |
| [CURING CONDITIONS] PRECURE TEMPERATURE (° C.) | 120 | 120 | 120 | 120 | 120 | 120 |
| TIME (HOURS) | 2 | 2 | 2 | 2 | 2 | 2 |
| POSTCURE TEMPERATURE (° C.) | 150 | 150 | 150 | 150 | 150 | 150 |
| TIME (HOURS) | 2 | 2 | 2 | 2 | 2 | 2 |
| [PROPERTIES AND PHASE STRUCTURE OF CURED RESIN] PEEL ADHESIVE STRENGTH (N/25 mm) | 8.55 | 36.56 | 31.90 | 53.4 | 6.44 | NOT MEASURED |
| FRACTURE MODE IN PEELING | INTERFACIAL | INTERFACIAL | INTERFACIAL | COHESIVE | INTERFACIAL | — |
| FRACTURE TOUGHNESS VALUE (MPa·m$^{1/2}$) | 1.87 | 1.91 | 1.70 | 1.65 | 1.74 | 0.64 |
| ELASTIC MODULUS (GPa) | 2.63 | 2.83 | NOT MEASURED | NOT MEASURED | 3.16 | 3.52 |
| PHASE STRUCTURE | MICROPHASE SEPARATION SPHERICAL STRUCTURE [1] | MICROPHASE SEPARATION SPHERICAL STRUCTURE [1] | MICROPHASE SEPARATION —[2] | MICROPHASE SEPARATION —[2] | MICROPHASE SEPARATION SPHERICAL STRUCTURE [1] | NO MICROPHASE SEPARATION |
| DIAMETER OF SPHERICAL STRUCTURAL BODY TEM METHOD [3](nm) | 44 | 44 | —[2] | —[2] | 31 | — |

[1] A microphase separation structure in which the polymer block B in the acrylic block copolymer forms a micro spherical structure and is dispersed in a matrix of a cured epoxy resin.
[2] Detailed structure is not confirmed.
[3] Measurement by a transmission electron microscope.

As shown in Table 4, since the curable resin compositions of Examples 6 to 9 each contain, together with the epoxy resin and the epoxy resin curing agent, one of the acrylic block copolymers (c-1), (c-3), (c-4), and (c-5) having a molecular weight distribution (Mw/Mn) of 1.5 or less in an amount in the range specified by the present invention, compared to the curable resin composition of Comparative Example 6 (curable resin composition containing no acrylic block copolymer), the curable resin compositions of Examples 6 to 9 each have a significantly improved fracture toughness and also an excellent peel adhesive strength.

Furthermore, the curable resin composition of Example 8 [curable resin composition containing the acrylic block copolymer (c-4) which has a molecular weight distribution (Mw/Mn) of 1.5 or less although having a similar molecular weight to that of the acrylic block copolymer (M22) used in Comparative Example 5 and a similar content of the polymer block B to that thereof] has a significantly excellent peel adhesive strength as compared to that of the curable resin composition of Comparative Example 5 [curable resin composition containing the acrylic block copolymer (M22) which has a molecular weight distribution (Mw/Mn) of more than 1.5 although having a similar molecular weight to that of the acrylic block copolymer (c-4) used in Example 8 and a similar content of the polymer block B to that thereof].

Example 10

(1) Manufacturing of Curable Resin Composition

After 100 g of bisphenol A diglycidyl ether (compound identical to that used in Example 1) and 39.02 g of the acrylic block copolymer (c-1) manufactured in Synthesis Example 1 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was then heated to 100° C. by an oven, 0.5 g of triphenylphosphine (compound identical to that used in Example 1) and 55.56 g of a phenol-formaldehyde novolac resin (resin identical to that used in Example 1) were added in this order. Subsequently, by using a stirring apparatus ("Awatori Rentaro ARV-310" manufactured by Thinky Corp.), while vacuum defoamation was performed (vacuum condition: 0.5 kPa, stirring condition: 2,000 rpm), mechanical stirring was performed for 10 minutes, so that a curable resin composition was prepared.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured by the methods described above, the results shown in the following Table 5 were obtained.

(ii) By using the curable resin composition obtained in the above (1), the same process and operation as those of the (2) (ii) of Comparative Example 6 were performed, so that a laminate (test specimen) was formed. By using this test specimen, when the shear adhesive strength was measured by the method described above, the result shown in the following Table 5 was obtained.

Figure 6:
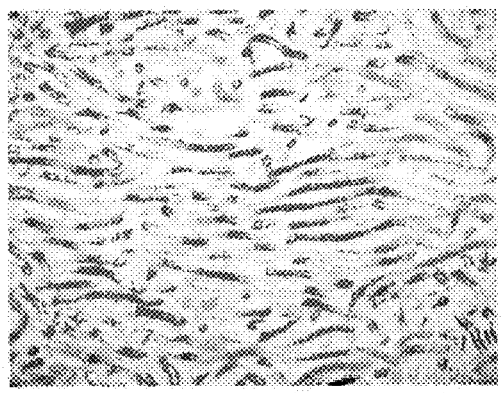
FIG. 6 includes photographs of cut surfaces of slices (a) and (b) sampled from a cured resin obtained by curing a curable resin composition according to Example 10, the photographs being taken using a transmission electron microscope.
Figure 6:
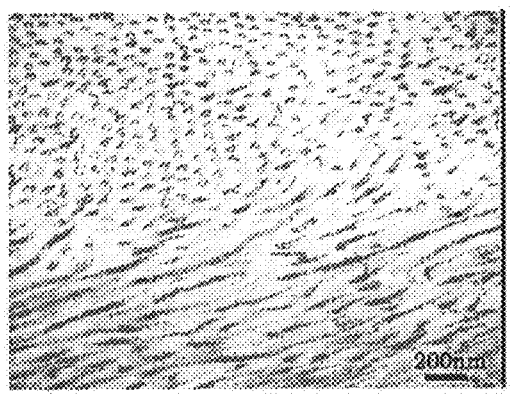

(iii) In addition, after the slices (a) and (b) were sampled by the method described above from the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), as shown in FIG. 6(a) [cut surface of the slice (a)] and FIG. 6(b) [cut surface of the slice (b)], a microphase separation structure was observed in which a poly(n-butyl acrylate) block portion (portion observed as a dark color portion) in the acrylic block copolymer (c-1) formed a micro linear structure and was dispersed in the cured epoxy resin matrix so as to be oriented in a predetermined direction.

After 10 dark color portions (linear structural bodies) in the photograph (magnification: 250,000 times) thus obtained were arbitrarily selected, when the diameters of the portions were measured and averaged, the result shown in the following Table 5 was obtained.

(iv) When a sample was cut out from the test specimen for fracture toughness value measurement manufactured in the above (i) and was then observed in accordance with the method described in the above (II-5d) using a polarization microscope, the anisotropy was observed. Accordingly, it is estimated that a microphase separation structure is present in which a micro linear structure is formed and is dispersed so as to be oriented in a predetermined direction.

Next, after the curable resin composition obtained in the above (1) was applied to a slide glass plate by a spatula, a cover glass was placed on the slide glass plate, and heating was performed in an oven set at a temperature of 120° C. to make the curable resin composition soft. Next, the curable resin composition was pressed by hand, so that an observation sample was formed. Observation was performed in a cross Nicol state using a polarization microscope ("Eclipse E600W POL" manufactured by Nikon Corp.) equipped with a heating/cooling stretch stage for microscope observation (manufactured by Japan High Tech Co., Ltd.). After the sample was heated to 120° C. at a temperature rise rate of 5° C./min and was then maintained at 120° C., when the optical transparency in a cross Nicol state was observed (magnification: 100 times), it was found that the anisotropy was advanced in the curing process.

Example 11

(1) Manufacturing of Curable Resin Composition

Except for using 39.02 g of the acrylic block copolymer (c-2) manufactured in Synthesis Example 2 instead of the acrylic block copolymer (c-1), a curable resin composition mixed by mechanical mixing was prepared in a manner similar to that of the (1) of Example 10.

(2) Manufacturing of Cured Resin and Measurement of Properties Thereof (i) By using the curable resin composition obtained in the above (1), the same processes and operations as those of (2) (i) and (ii) of Example 1 were performed respectively to form a test specimen (a length of 50 mm, a width of 12 mm, and a thickness of 6 mm) for fracture toughness value measurement and a test specimen (a length of 40 mm, a width of 10 mm, and a thickness of 2 mm) for elastic modulus measurement, and when the fracture toughness value and the elastic modulus were measured by the methods described above, the results shown in the following Table 5 were obtained.

(ii) By using the curable resin composition obtained in the above (1), the same process and operation as those of the (2) (ii) of Comparative Example 6 were performed, so that a laminate (test specimen) was formed. By using this test specimen, when the shear adhesive strength was measured by the method described above, the result shown in the following Table 5 was obtained.

Figure 7:
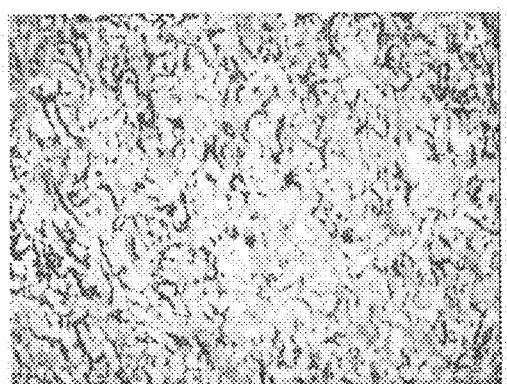
FIG. 7 includes photographs of cut surfaces of slices (a) and (b) sampled from a cured resin obtained by curing a curable resin composition according to Example 11, the photographs being taken using a transmission electron microscope.
Figure 7:
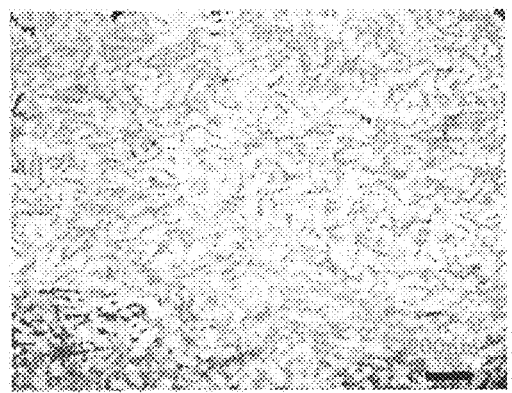

(iii) In addition, after the slices (a) and (b) were sampled by the method described above from the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), as shown in FIG. 7(a) [cut surface of the slice (a)] and FIG. 7(b) [cut surface of the slice (b)], a microphase separation structure was observed in which a poly(n-butyl acrylate) block portion (portion observed as a dark color portion) in the acrylic block copolymer (c-2) formed a micro linear structure and was randomly dispersed in the cured epoxy resin matrix.

After 10 dark color portions (linear structural bodies) in the photograph (magnification: 250,000 times) thus obtained were arbitrarily selected, when the diameters of the portions were measured and averaged, the result shown in the following Table 5 was obtained.

(iv) After a sample was cut out from the test specimen for fracture toughness value measurement manufactured in the above (i), observation was performed in accordance with the method described in the above (II-5d) using a polarization microscope, and no anisotropy (orientation) was observed.

Example 12

(1) Manufacturing of Curable Resin Composition

Except for using 39.02 g of the acrylic block copolymer (c-3) manufactured in Synthesis Example 3 instead of the acrylic block copolymer (c-1), a curable resin composition mixed by mechanical mixing was prepared in a manner similar to that of the (1) of Example 10.

(2) Manufacturing of Cured Resin and Measurement of Properties Thereof (i) By using the curable resin composition obtained in the above (1), the same processes and operations as those of (2)(i), and (ii) of Example 1 were performed respectively to form a test specimen (a length of 50 mm, a width of 12 mm, and a thickness of 6 mm) for fracture toughness value measurement, and a test specimen (a length of 40 mm, a width of 10 mm, and a thickness of 2 mm) for elastic modulus measurement, and the same process and operation as those of the (2)(ii) of Comparative Example 6 were performed to form a laminate (test specimen) for shear adhesive strength measurement, and when the fracture toughness value, the elastic modulus, and a fracture adhesive strength were measured by the methods described above, the results shown in the following Table 5 were obtained.

Figure 8:
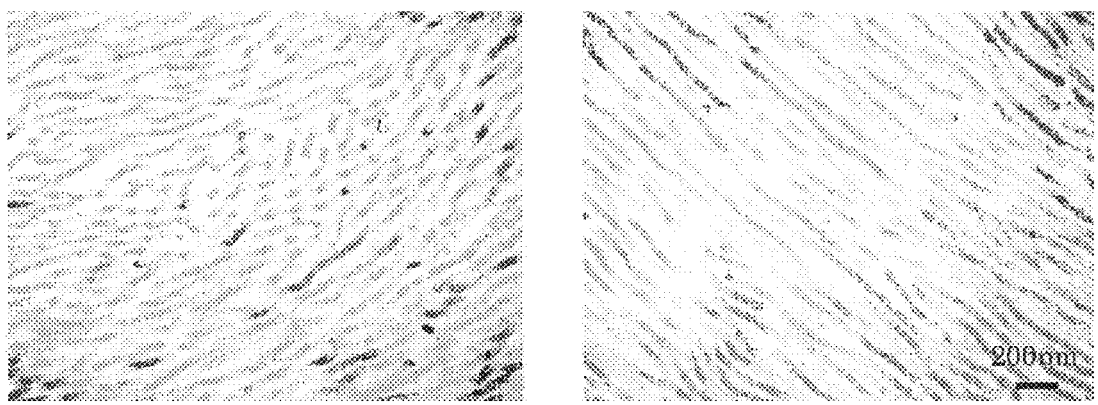
FIG. 8 includes photographs of cut surfaces of slices (a) and (b) sampled from a cured resin obtained by curing a curable resin composition according to Example 12, the photographs being taken using a transmission electron microscope.

(ii) In addition, after the slices (a) and (b) were sampled by the method described above from the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), as shown in FIG. 8(a) [cut surface of the slice (a)] and FIG. 8(b) [cut surface of the slice (b)], a microphase separation structure was observed in which a poly(n-butyl acrylate) block portion (portion observed as a dark color portion) in the acrylic block copolymer (c-3) formed a micro linear structure and was dispersed in the cured epoxy resin matrix so as to be oriented in a predetermined direction.

After 10 dark color portions (linear structural bodies) in the photograph (magnification: 250,000 times) thus obtained were arbitrarily selected, when the diameters of the portions were measured and averaged, the result shown in the following Table 5 was obtained.

(iii) After a sample was cut out from the test specimen for fracture toughness value measurement manufactured in the above (i), when observation was performed in accordance with the method described in the above (II-5d) using a polarization microscope, the anisotropy was observed. Accordingly, it is estimated that a microphase separation structure is present in which a micro linear structure is formed and dispersed so as to be oriented in a predetermined direction.

Comparative Example 7

(1) Manufacturing of Curable Resin Composition

Except for using 39.02 g of the commercially available acrylic block copolymer (M22) instead of the acrylic block copolymer (c-1), a curable resin composition mixed by mechanical mixing was prepared in a manner similar to that of the (1) of Example 8.

(2) Manufacturing of Cured Resin and Measurement of Properties Thereof (i) By using the curable resin composition obtained in the above (1), the same processes and operations as those of (2) (i), (ii), and (iii) of Example 1 were performed respectively to form a test specimen (a length of 50 mm, a width of 12 mm, and a thickness of 6 mm) for fracture toughness value measurement, a test specimen (a length of 40 mm, a width of 10 mm, and a thickness of 2 mm) for elastic modulus measurement, and a laminate (test specimen) for peel adhesive strength measurement, and when the fracture toughness value, the elastic modulus, and the peel adhesive strength were measured respectively by the methods described above, the results shown in the following Table 5 were obtained.

(ii) In addition, after the slices (a) and (b) were sampled by the method described above from the test specimen for fracture toughness value measurement manufactured in the above (i), when the cut surfaces of the slices (a) and (b) were photographed by the method of the above (II-5c) using a transmission electron microscope (magnification: 50,000 times and 250,000 times), a microphase separation structure was observed in which a poly(n-butyl acrylate) block portion in the acrylic block copolymer (M22) formed a micro linear structure and was randomly dispersed in the cured epoxy resin matrix.

After 10 dark color portions (linear structural bodies) in the photograph (magnification: 250,000 times) thus obtained were arbitrarily selected, when the diameters of the portions were measured and averaged, the result shown in the following Table 5 was obtained.

In the following Table 5, the results of Comparative Example 6 are again shown for reference.

TABLE 5

| | EXAMPLE 10 | EXAMPLE 11 | EXAMPLE 12 | COMPARATIVE EXAMPLE 6 | COMPARATIVE EXAMPLE 7 |
|---|---|---|---|---|---|
| [EPOXY RESIN COMPOSITION (MECHANICAL STIRRING AND MIXING) (PARTS BY MASS)] EPOXY RESIN | | | | | |
| BISPHENOL A DIGLYCIDYL ETHER | 100 | 100 | 100 | 100 | 100 |
| EPOXY RESIN CURING AGENT | | | | | |
| PHENOL NOVOLAC RESIN | 55.56 | 55.56 | 55.56 | 55.56 | 55.56 |
| DICYANDIAMIDE | | | | | |
| DIAMINODIPHENYLSULFONE | | | | | |
| CURING ACCELERATOR | | | | | |
| TRIPHENYLPHOSPHINE | 0.5 | 0.5 | 0.5 | 0.5 | 0.5 |
| DICHLOROPHENYL DIMETHYLUREA | | | | | |
| ACRYLIC BLOCK COPOLYMER | | | | | |
| ACRYLIC BLOCK COPOLYMER (c-1) (Mw = 161,000, Mw/Mn = 1.28) | 39.02 | | | | |
| ACRYLIC BLOCK COPOLYMER (c-2) (Mw = 63,000, Mw/Mn = 1.26) | | 39.02 | | | |
| ACRYLIC BLOCK COPOLYMER (c-3) (Mw = 132,000, Mw/Mn = 1.31) | | | 39.02 | | |
| ACRYLIC BLOCK COPOLYMER (M22) (Mw = 132,000, Mw/Mn = 1.89) | | | | | 39.02 |
| [CURING CONDITIONS] PRECURE | | | | | |
| TEMPERATURE (° C.) | 120 | 120 | 120 | 120 | 120 |
| TIME (HOURS) | 2 | 2 | 2 | 2 | 2 |

TABLE 5-continued

| | EXAMPLE 10 | EXAMPLE 11 | EXAMPLE 12 | COMPARATIVE EXAMPLE 6 | COMPARATIVE EXAMPLE 7 |
|---|---|---|---|---|---|
| POSTCURE | | | | | |
| TEMPERATURE (° C.) | 150 | 150 | 150 | 150 | 150 |
| TIME (HOURS) | 2 | 2 | 2 | 2 | 2 |
| [PROPERTIES AND PHASE STRUCTURE OF CURED RESIN] | | | | | |
| PEEL ADHESIVE STRENGTH (N/25 mm) | 68.90 | NOT MEASURED | 50.15 | NOT MEASURED | 27.90 |
| FRACTURE MODE IN PEELING | INTERFACIAL | — | INTERFACIAL | — | INTERFACIAL |
| FRACTURE TOUGHNESS VALUE | 27.2 | 29.7 | NOT MEASURED | 17.1 | NOT MEASURED |
| SHEAR ADHESIVE STRENGTH (MPa·m$^{1/2}$) | 2.51 | 2.37 | 2.61 | 0.64 | 2.01 |
| ELASTIC MODULUS (GPa) | 2.52 | 2.50 | 2.52 | 3.52 | 2.90 |
| PHASE STRUCTURE | MICROPHASE SEPARATION LINER STRUCTURE[1] WITH ORIENTATION | MICROPHASE SEPARATION LINER STRUCTURE[1] WITHOUT ORIENTATION | MICROPHASE SEPARATION LINER STRUCTURE[1] WITH ORIENTATION | NO MICROPHASE SEPARATION | MICROPHASE SEPARATION LINER STRUCTURE[1] WITHOUT ORIENTATION |
| DIAMETER OF LINEAR STRUCTURAL BODY TEM METHOD[2] (nm) | 42 | 32 | 45 | — | 37 |

[1]A microphase separation structure in which the polymer block B in the acrylic block copolymer forms a micro linear structure and is dispersed in a matrix of a cured epoxy resin.
[2]Measurement by a transmission electron microscope.

As shown in Table 5, since the curable resin compositions of Examples 10 to 12 contain in the epoxy resin, together with the epoxy resin curing agent, the acrylic block copolymers (c-1), (c-2), and (c-3), respectively, each having a weight average molecular weight (Mw) in the range of 30,000 to 300,000 and a molecular weight distribution (Mw/Mn) of 1.5 or less, compared to the curable resin composition of Comparative Example 7 which has a molecular weight distribution of more than 1.5 although having a weight average molecular weight (Mw) of 30,000 to 300,000, the curable resin compositions of Examples 10 to 12 each have a high fracture toughness value, is hardly fractured even if receiving an external force, and has an excellent durability.

Among the curable resin compositions of Examples 10 to 12, the cured resins of the curable resin compositions of Examples 10 and 12 each have a higher fracture toughness value, a higher strength, and a more excellent durability since the polymer block B in the acrylic block copolymer (c) has a micro linear structure and is dispersed in the matrix of the epoxy resin so as to be oriented in a predetermined direction.

In addition, as shown in the results of Examples 10 and 11, the curable resin composition of the present invention in which the acrylic block copolymer having a weight average molecular weight (Mw) of 30,000 to 300,000 and a molecular weight distribution (Mw/Mn) of 1.5 or less was blended with the epoxy resin together with the epoxy resin curing agent forms a cured resin which is not only excellent in fracture toughness and peel adhesive strength but also excellent in shear adhesive strength.

Example 13

(1) Manufacturing of Curable Resin Composition

After 100 g of bisphenol A diglycidyl ether (compound identical to that used in Example 1) and 17.34 g of the acrylic block copolymer (c-1) manufactured in Synthesis Example 1 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was again heated to approximately 100° C. by an oven, 3.0 g of dichlorophenyl dimethylurea [manufactured by Hodogaya Chemical Co., Ltd.] (curing accelerator) and 5.0 g of dicyandiamide ["Epicure DICY7" manufactured by Japan Epoxy Resin Co., Ltd.] (epoxy resin curing agent) were added in this order, and by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) Manufacturing of Test Specimen (Cured Resin) for Fracture Toughness Value Measurement After being heated to 100° C. and vacuum-defoamed for 20 minutes, the curable resin composition obtained in the above (1) was poured into an aluminum-made mold which was processed by the same mold-releasing treatment as that used in the (2) (i) of Example 1, and a precure was performed at 110° C. for 2 hours. Subsequently, a postcure was performed at 150° C. for 1 hour, and a test specimen for fracture toughness value measurement (a length of 50 mm, a width of 12 mm, and a thickness of 6 mm) was formed from the cured resin thus obtained by cutting. When the fracture toughness value was measured by the method described above using this test specimen, the result shown in the following Table 6 was obtained.

(ii) Manufacturing of Test Specimen (Laminate) for Measurement of Peel Adhesive Strength and Measurement Thereof After being heated to 100° C. and vacuum-defoamed for 20 minutes, the curable resin composition obtained in the above (1) was applied to the aluminum-plate substrate identical to that used in the (2) (iii) of Example 1, and an adhesive layer was controlled to have a thickness (before curing) of approximately 100 μm using a spacer. Subsequently, after a precure was performed at 110° C. for 2 hours, a postcure was performed at 150° C. for 1 hour, and cooling was then performed to room temperature (25° C.), so that a laminate (test specimen) for peel adhesive strength measurement was formed. By using this test specimen, when the peel adhesive strength was measured by the method described above, the result shown in the following Table 6 was obtained.

Example 14

(1) Manufacturing of Curable Resin Composition

After 100 g of bisphenol A diglycidyl ether (compound identical to that used in Example 1) and 39.02 g of the acrylic block copolymer (c-1) manufactured in Synthesis Example 1 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was again heated to approximately 100° C. by an oven, 3.0 g of dichlorophenyl dimethylurea (compound identical to that used in Example 13), and 5.0 g of dicyandiamide (compound identical to that used in Example 13) were added in this order, and by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof

By using the curable resin composition obtained in the above (1), the same processes and operations as those of (2)(i) and (ii) of Example 13 were performed respectively to form a test specimen (a length of 50 mm, a width of 12 mm, and a thickness of 6 mm) for fracture toughness value measurement and a laminate (test specimen) for peel adhesive strength measurement, and when the fracture toughness value and the peel adhesive strength were measured respectively by the methods described above, the results shown in the following Table 6 were obtained.

Example 15

(1) Manufacturing of Curable Resin Composition

After 100 g of bisphenol A diglycidyl ether (compound identical to that used in Example 1) and 39.02 g of the acrylic block copolymer (c-1) manufactured in Synthesis Example 1 were placed in a container, the container was immersed in an oil bath set at a temperature of 200° C., and the content in the container was stirred for 30 minutes using a stirring device (the same device as that used in Example 1, 400 rpm). Next, after the container was recovered from the oil bath, was cooled to room temperature, and was again heated to approximately 100° C. by an oven, 32.85 g of diaminodiphenylsulfone (compound identical to that used in Comparative Example 3) (epoxy resin curing agent) was added, and by using a stirring bar made of stainless steel, stirring and mixing were sufficiently performed by hand until a uniform state was obtained (stirring was performed at a temperature of 100° C. for approximately 10 minutes), so that a curable resin composition was prepared.

(2) Manufacturing of Cured Resin and Measurement of Properties Thereof (i) Manufacturing of Test Specimen (Cured Resin) for Fracture Toughness Value Measurement After being heated to 120° C. and vacuum-defoamed for 30 minutes, the curable resin composition obtained in the above (1) was poured into an aluminum-made mold which was processed by the same mold-releasing treatment as that used in the (2) (i) of Example 1, and a precure was performed at 150° C. for 3 hours. Subsequently, a postcure was performed at 200° C. for 2 hours, and a test specimen for fracture toughness value measurement (a length of 50 mm, a width of 12 mm, and a thickness of 6 mm) was formed from the cured resin thus obtained by cutting. When the fracture toughness value was measured by the method described above using this test specimen, the result shown in the following Table 6 was obtained.

(ii) Manufacturing of Test Specimen (Laminate) for Measurement of Peel Adhesive Strength and Measurement Thereof After being heated to 120° C. and vacuum-defoamed for 20 minutes, the curable resin composition obtained in the above (1) was applied to the aluminum-plate substrate identical to that used in the (2) (iii) of Example 1, and an adhesive layer was controlled to have a thickness (before curing) of approximately 100 μm using a spacer. Subsequently, after a precure was performed at 150° C. for 3 hours, a postcure was performed at 200° C. for 2 hours, and cooling was then performed to room temperature (25° C.), so that a laminate (test specimen) for peel adhesive strength measurement was formed. By using this test specimen, when the peel adhesive strength was measured by the method described above, the result shown in the following Table 6 was obtained.

TABLE 6

| | EXAMPLE 13 | EXAMPLE 14 | EXAMPLE 15 |
|---|---|---|---|
| [EPOXY RESIN COMPOSITION (HAND STIRRING AND MIXING) (PARTS BY MASS)] | | | |
| EPOXY RESIN | | | |
| BISPHENOL A DIGLYCIDYL ETHER | 100 | 100 | 100 |
| EPOXY RESIN CURING AGENT | | | |
| PHENOL NOVOLAC RESIN | | | |
| DICYANDIAMIDE | 5.0 | 5.0 | |
| DIAMINODIPHENYLSULFONE | | | 32.85 |
| CURING ACCELERATOR | | | |
| TRIPHENYLPHOSPHINE | | | |
| DICHLOROPHENYL DIMETHYLUREA | 3.0 | 3.0 | |
| ACRYLIC BLOCK COPOLYMER | | | |
| ACRYLIC BLOCK COPOLYMER (c-1) (Mw = 161,000, Mw/Mn = 1.28) | 17.34 | 39.02 | 39.02 |
| [CURING CONDITIONS] | | | |

TABLE 6-continued

|  | EXAMPLE 13 | EXAMPLE 14 | EXAMPLE 15 |
|---|---|---|---|
| PRECURE |  |  |  |
| TEMPERATURE (° C.) | 110 | 110 | 150 |
| TIME (HOURS) | 2 | 2 | 3 |
| POSTCURE |  |  |  |
| TEMPERATURE (° C.) | 150 | 150 | 200 |
| TIME (HOURS) | 1 | 1 | 2 |
| [PROPERTIES AND PHASE STRUCTURE OF CURED RESIN] |  |  |  |
| PEEL ADHESIVE STRENGTH (N/25 mm) | 9.64 | 29.03 | 8.529 |
| FRACTURE MODE IN PEELING | INTERFACIAL | INTERFACIAL | INTERFACIAL |
| FRACTURE TOUGHNESS VALUE (MPa·m$^{1/2}$) | 1.16 | OUT OF RANGE OF MEASUREMENT[1] | OUT OF RANGE OF MEASUREMENT[1] |

[1] Since a load-displacement curve is not linear, measurement is not performed in accordance with ASTM D5045-91.

INDUSTRIAL APPLICABILITY

While maintaining properties, such as excellent heat resistance and elastic modulus, inherent in the epoxy resin, the cured resin obtained from the curable resin composition of the present invention is excellent in fracture toughness, is hardly fractured even if receiving an external force, is strong, and is excellent in durability, and in addition, since the cured resin can be strongly adhered to various materials, a laminate construction and/or a composite construction having an excellent strength can be formed. Furthermore, since the cured resin is excellent in weather resistance and chemical resistance, the curable resin composition of the present invention can be effectively used in various applications, such as a sealing material for electric and electronic materials, a laminate for electrical use including a printed circuit board, an automobile component, a structure adhesive, an electrical insulating material, a coating material, a material for civil engineering and construction, and a matrix resin represented, for example, by a fiber reinforced composite material for sport application, aircraft materials, and the like.

The invention claimed is:

1. A curable resin composition which comprises:
100 parts by mass of an epoxy resin (a); 1 to 70 parts by mass of an epoxy resin curing agent (b); and 1 to 35 parts by mass of an acrylic block copolymer (c),
wherein the acrylic block copolymer (c) is an acrylic block copolymer which satisfies requirements (α) to (δ):
(α) the acrylic block copolymer is a block copolymer comprising at least one polymer block A comprised of an alkyl methacrylate in reacted form and at least one polymer block B comprised of an alkyl acrylate in reacted form;
(β) the weight average molecular weight is 30,000 to 132,000;
(γ) the molecular weight distribution [weight average molecular weight (Mw)/number average molecular weight (Mn)] is 1.5 or less; and
(δ) the content ratio of the polymer block A is from 31.3 to 45 percent by mass, based on the mass of the acrylic block copolymer (c).

2. The curable resin composition according to claim 1, further comprising a curing accelerator.

3. The curable resin composition according to claim 1, wherein the epoxy resin (a) is a bisphenol A epoxy resin.

4. The curable resin composition according to claim 1, wherein the epoxy resin curing agent (b) is a phenol novolac resin.

5. The curable resin composition according to claim 1, wherein the acrylic block copolymer (c) is an acrylic block copolymer mainly composed of at least one type selected from a triblock copolymer composed of polymer block A-polymer block B-polymer block A and a diblock copolymer composed of polymer block A-polymer block B.

6. The curable resin composition according to claim 1, wherein the polymer block A in the acrylic block copolymer (c) is a polymer block of a poly(methyl methacrylate).

7. The curable resin composition according to claim 1, wherein the polymer block B in the acrylic block copolymer (c) is a polymer block comprised of a polymer of at least one of alkyl acrylate selected from ethyl acrylate, butyl acrylate, octyl acrylate, and 2-ethylhexyl acrylate, present in reacted form.

8. The curable resin composition according to claim 1, wherein when curing is performed at a temperature of 20° C. to 250° C. for 1 to 24 hours, a cured resin is formed having a microphase separation structure in which the polymer block B in the acrylic block copolymer (c) forms a micro phase separation structure and is dispersed in a matrix composed of a cured epoxy resin.

9. The curable resin composition according to claim 8, wherein when the curing is performed at a temperature of 20° C. to 250° C. for 1 to 24 hours, the cured resin is formed having a microphase separation structure in which the polymer block B in the acrylic block copolymer (c) forms a micro linear structure and is dispersed in the matrix composed of the cured epoxy resin.

10. The curable resin composition according to claim 9, wherein when the curing is performed at a temperature of 20° C. to 250° C. for 1 to 24 hours, the cured resin is formed having a microphase separation structure in which the polymer block B in the acrylic block copolymer (c) forms a micro linear structure and is dispersed in the matrix composed of the cured epoxy resin so as to be oriented in a predetermined direction.

11. A cured resin obtained by curing the curable resin composition according to claim 1.

12. The cured resin according to claim 11, wherein the cured resin has a microphase separation structure in which the polymer block B in the acrylic block copolymer (c) forms a micro phase separation structure and is dispersed in a cured epoxy resin matrix.

13. The cured resin according to claim 12, wherein the cured resin has a microphase separation structure in which the polymer block B in the acrylic block copolymer (c) forms a micro linear structure and is dispersed in the cured epoxy resin matrix.

14. The cured resin according to claim 13, wherein the cured resin has a microphase separation structure in which the polymer block B in the acrylic block copolymer (c) forms a micro linear structure and is dispersed in the cured epoxy resin matrix so as to be oriented in a predetermined direction.

15. The cured resin according to claim 11, wherein a fracture toughness value (K1c) by a Single Edge Notched Bending (SENB) test in accordance with ASTM D5045-91 is 1.6 MPa·m$^{1/2}$ or more.

16. The cured resin according to claim 11, wherein a peel adhesive strength to an aluminum plate at a peeling rate of 100 mm/min in accordance with JIS K 6854-3 is 10 N/25 mm or more.

17. A curable resin composition which comprises:
100 parts by mass of an epoxy resin (a);
1 to 70 parts by mass of an epoxy resin curing agent (b);
1 to 35 parts by mass of an acrylic block copolymer (c), and
a curing accelerator that comprises 3-(3,4-dichlorophenyl)-1,1-dimethylurea,
wherein the acrylic block copolymer (c) is an acrylic block copolymer which satisfies requirements (α) to (δ):
  (α) the acrylic block copolymer is a block copolymer comprising at least two polymer blocks A and A', each comprised of an alkyl methacrylate in reacted form and at least one polymer block B comprised of an alkyl acrylate in reacted form;
  (β) the weight average molecular weight is 30,000 to 132,000;
  (γ) the molecular weight distribution [weight average molecular weight (Mw)/number average molecular weight (Mn)] is 1.5 or less; and
  (δ) the content ratio in each of the polymer blocks A and A' is from 31.3 to 45 percent by mass, based on the mass of the acrylic block copolymer (c); and
said blocks A and A' are each bound to said at least one polymer block B to form a triblock copolymer represented by A-B-A'.

18. The curable resin composition according to claim 17, wherein the content ratio of the polymer block B is from 90 to 55 percent by mass, based on the mass of the acrylic block copolymer (c).

19. The curable resin composition according to claim 17, wherein the content ratio of the polymer block B is from 85 to 65 percent by mass, based on the mass of the acrylic block copolymer (c).

20. The curable resin composition according to claim 17, wherein the molecular weight distribution of the acrylic block copolymer (c) is 1.3 or less.

21. The curable resin composition according to claim 17, wherein the molecular weight distribution of the acrylic block copolymer (c) is 1.2 or less.

22. The curable resin composition according to claim 17, wherein each of blocks A and A' are blocks comprised of at least 80 percent by mass of methyl methacrylate in reacted form and block B is a block comprised of at least 80 percent by mass of n-butyl acrylate in reacted form.

23. The curable resin composition according to claim 1, wherein (β) the weight average molecular weight is 30,000 to 73,000.

24. The curable resin composition according to claim 17, wherein (β) the weight average molecular weight is 30,000 to 73,000.

* * * * *